(12) United States Patent
Anegawa et al.

(10) Patent No.: US 11,584,070 B2
(45) Date of Patent: Feb. 21, 2023

(54) METHOD OF MANUFACTURING THREE-DIMENSIONAL SHAPED OBJECT AND THREE-DIMENSIONAL SHAPING DEVICE

(71) Applicant: SEIKO EPSON CORPORATION, Tokyo (JP)

(72) Inventors: Kenta Anegawa, Matsumoto (JP); Daizo Aoyagi, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 141 days.

(21) Appl. No.: 17/184,888

(22) Filed: Feb. 25, 2021

(65) Prior Publication Data
US 2021/0268733 A1 Sep. 2, 2021

(30) Foreign Application Priority Data
Feb. 28, 2020 (JP) .............................. JP2020-033137

(51) Int. Cl.
*B29C 64/194* (2017.01)
*B29C 64/236* (2017.01)
(Continued)

(52) U.S. Cl.
CPC .......... *B29C 64/194* (2017.08); *B29C 64/209* (2017.08); *B29C 64/232* (2017.08); *B29C 64/236* (2017.08); *B29C 64/295* (2017.08); *B29C 64/329* (2017.08); *B29C 69/001* (2013.01); *B22F 10/18* (2021.01); *B22F 10/30* (2021.01); *B22F 10/50* (2021.01); *B22F 10/85* (2021.01); *B22F 12/10* (2021.01); *B22F 12/13* (2021.01); *B22F 12/53* (2021.01); *B22F 12/84* (2021.01); *B22F 2003/245* (2013.01);
(Continued)

(58) Field of Classification Search
CPC ... B29C 64/194; B29C 64/329; B29C 64/232; B29C 64/295; B29C 64/209; B29C 64/236; B29C 64/188; B29C 69/001; B33Y 10/00; B33Y 30/10; B33Y 40/00; B22F 10/30; B22F 10/50; B22F 10/18; B22F 10/85; B22F 12/84; B22F 12/13; B22F 12/53; B22F 12/10; B22F 2003/245
USPC ........................................................ 264/138
See application file for complete search history.

(56) References Cited

U.S. PATENT DOCUMENTS

| | | | |
|---|---|---|---|
| 2002/0041818 A1* | 4/2002 | Abe ......................... | B22F 10/50 419/7 |
| 2018/0093350 A1* | 4/2018 | Koch ...................... | B33Y 30/00 |
| 2019/0283324 A1* | 9/2019 | Tarumi ................... | B33Y 10/00 |

FOREIGN PATENT DOCUMENTS

JP        2019-031011        2/2019

* cited by examiner

*Primary Examiner* — Joseph S Del Sole
*Assistant Examiner* — Lawrence D. Hohenbrink, Jr.
(74) *Attorney, Agent, or Firm* — Workman Nydegger

(57) ABSTRACT

A method of manufacturing a three-dimensional shaped object, which is a method of shaping a three-dimensional shaped object using a cutting tool configured to cut a first length in a cutting direction, includes: a first portion shaping step of stacking a shaping material to shape a first portion having a length in the cutting direction shorter than the first length; a first portion cutting step of cutting the first portion in the cutting direction by the cutting tool; and a second portion shaping step of stacking the shaping material to couple to a first end surface of the first portion in a direction opposite to the cutting direction, and to shape a second portion having a length in the cutting direction shorter than that of the first portion.

8 Claims, 15 Drawing Sheets

(51) Int. Cl.
  *B29C 64/329*   (2017.01)
  *B29C 69/00*    (2006.01)
  *B29C 64/209*   (2017.01)
  *B29C 64/295*   (2017.01)
  *B29C 64/232*   (2017.01)
  *B33Y 40/00*        (2020.01)
  *B33Y 30/00*        (2015.01)
  *B33Y 10/00*        (2015.01)
  *B29C 64/188*       (2017.01)
  *B22F 12/53*        (2021.01)
  *B22F 10/85*        (2021.01)
  *B22F 10/30*        (2021.01)
  *B22F 10/50*        (2021.01)
  *B22F 12/84*        (2021.01)
  *B22F 12/10*        (2021.01)
  *B22F 10/18*        (2021.01)
  *B22F 12/13*        (2021.01)
  *B22F 3/24*         (2006.01)

(52) U.S. Cl.
  CPC ............ *B29C 64/188* (2017.08); *B33Y 10/00* (2014.12); *B33Y 30/00* (2014.12); *B33Y 40/00* (2014.12)

```
       ⎧ COM1 ──→ X55  Y50  Z20
       ⎪ COM2 ──→ X50  Y55  Z20  E10
Dm1 ──⎨  COM3 ──→ X45  Y60  Z20  E10
       ⎪
       ⎩ COM4 ──→ EOM

⎧ COM5 ──→ X55  Y60  Z20
Dc1 ──⎨  COM6 ──→ X50  Y55  Z20  F10
       ⎩ COM7 ──→ EOM
```

METHOD OF MANUFACTURING THREE-DIMENSIONAL SHAPED OBJECT AND THREE-DIMENSIONAL SHAPING DEVICE

The present application is based on, and claims priority from JP Application Serial Number 2020-033137, filed Feb. 28, 2020, the disclosure of which is hereby incorporated by reference herein in its entirety.

BACKGROUND

1. Technical Field

The present disclosure relates to a method of manufacturing a three-dimensional shaped object and a three-dimensional shaping device.

2. Related Art

There is a three-dimensional shaping device that disposes a material having fluidity in a desired position to shape a three-dimensional shaped object.

For example, JP-A-2019-31011 discloses a molded product manufacturing apparatus including a shaping machine configured to shape a shaped object by a heat-melting stacking method and a cutting machine configured to cut and process the shaped object shaped by the shaping machine.

In the molded product manufacturing apparatus as described above, when a three-dimensional shaped object is shaped by repeating shaping and cutting, when a new layer is stacked on a cut layer, the cut layer is distorted due to a shrinkage stress of the new layer. Accordingly, a step may be occurred on a surface of the shaped object.

SUMMARY

One aspect of a method of manufacturing a three-dimensional shaped object according to the present disclosure, which is a method of shaping a three-dimensional shaped object using a cutting tool configured to cut a first length in a cutting direction, includes: a first portion shaping step of stacking a shaping material to shape a first portion having a length in the cutting direction shorter than the first length; a first portion cutting step of cutting the first portion in the cutting direction by the cutting tool; and a second portion shaping step of stacking the shaping material to couple to a first end surface of the first portion in a direction opposite to the cutting direction, and to shape a second portion having a length in the cutting direction shorter than that of the first portion.

One aspect of a three-dimensional shaping device according to the present disclosure includes: a shaping machine configured to stack a shaping material; a cutting machine having a cutting tool configured to cut a first length in a cutting direction; and a control unit configured to control the shaping machine and the cutting machine, in which the control unit causes the shaping machine to stack the shaping material to shape a first portion having a length in the cutting direction shorter than the first length; causes the cutting machine to cut the first portion in the cutting direction using the cutting tool; and causes the shaping machine to stack the shaping material to couple to a first end surface of the first portion in a direction opposite to the cutting direction, and to shape a second portion having a length in the cutting direction shorter than that of the first portion.

DESCRIPTION OF EXEMPLARY EMBODIMENTS

Hereinafter, a preferred embodiment of the present disclosure will be described in detail with reference to the drawings. The embodiment described below does not unreasonably limit contents of the present disclosure described in the appended claims. Not all configurations described below are necessarily essential components of the present disclosure.

1. Three-Dimensional Shaping Device 1.1. Configuration

Figure 1:
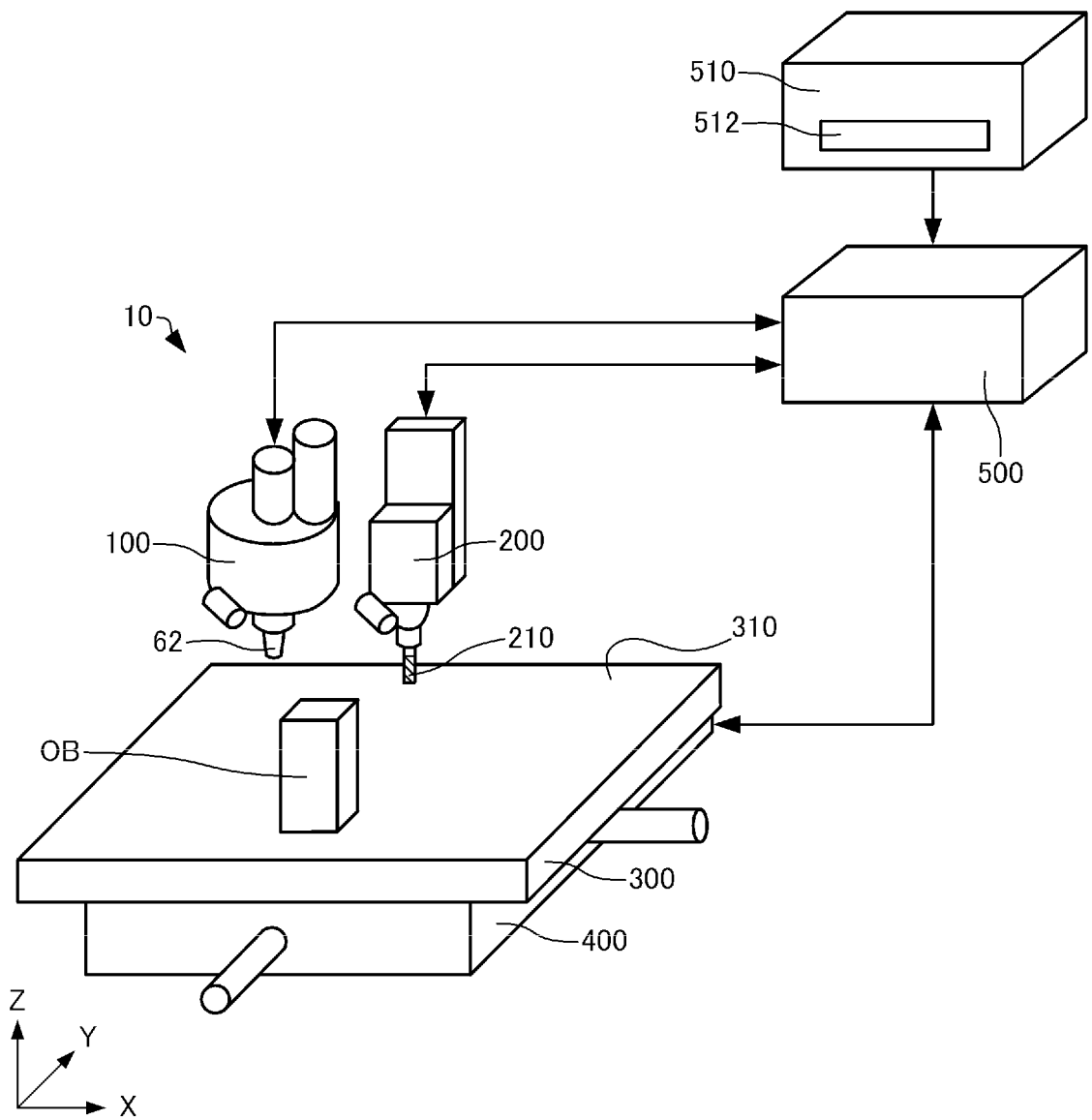
FIG. 1 is a diagram schematically showing a three-dimensional shaping device according to the present embodiment.

First, a three-dimensional shaping device according to the present embodiment will be described with reference to the drawings. FIG. 1 is a diagram schematically showing a three-dimensional shaping device 10 according to the present embodiment. FIG. 1 shows an X axis, a Y axis, and a Z axis as three axes orthogonal to one another. An X-axis direction and a Y-axis direction are, for example, horizontal directions. A Z-axis direction is, for example, a vertical direction.

As shown in FIG. 1, the three-dimensional shaping device 10 includes, for example, a shaping machine 100, a cutting machine 200, a stage 300, a moving mechanism 400, a control unit 500, and an information processing device 510.

The three-dimensional shaping device 10 drives the moving mechanism 400 to change a relative position between a nozzle 62 of the shaping machine 100 and the stage 300 while discharging a shaping material from the nozzle 62 to the stage 300. Accordingly, the shaping machine 100 stacks the shaping material on the stage 300.

Further, the three-dimensional shaping device 10 drives the moving mechanism 400 to change a relative position between a cutting tool 210 of the cutting machine 200 and the stage 300 while rotating the cutting tool 210. Accordingly, the cutting machine 200 cuts the shaping material stacked on the stage 300. Thus, the three-dimensional shaping device 10 shapes a three-dimensional shaped object OB having a desired shape. For convenience, in FIG. 1, the three-dimensional shaped object OB is shown in a simplified manner.

The shaping machine 100 discharges the shaping material from the nozzle 62 toward a shaping surface 310 of the stage 300. A detailed configuration of the shaping machine 100 will be described later.

The cutting machine 200 has the cutting tool 210 attached to a tip end thereof. In the illustrated example, the cutting tool 210 is a rod-shaped member extending in the Z-axis direction. The cutting machine 200 is a cutting device that cuts the shaping material stacked on the stage 300 by rotating the cutting tool 210 about a rotation axis parallel to the Z axis. As the cutting tool 210, for example, a flat end mill or a ball end mill is used. The cutting machine 200 detects a position of a tip end of the cutting tool 210 by, for example, a position detection sensor, and transmits a detection result to the control unit 500. The control unit 500 uses the detection result from the cutting machine 200 to control a relative positional relationship between the cutting tool 210 and the stacked shaping material by the moving mechanism 400 to perform cutting. The cutting machine 200 may include a static eliminator such as an ionizer.

The shaping material is stacked on the shaping surface 310 of the stage 300. The stage 300 is moved by the moving mechanism 400.

The moving mechanism 400 changes a relative position between the shaping machine 100 or the cutting machine 200 and the stage 300. In the illustrated example, the moving mechanism 400 moves the stage 300 with respect to the shaping machine 100 and the cutting machine 200. The moving mechanism 400 is implemented by a three-axis positioner that moves the stage 300 in the X-axis direction, the Y-axis direction, and the Z-axis direction by, for example, drive force of three motors. The motor of the moving mechanism 400 is driven under the control of the control unit 500.

The moving mechanism 400 may be configured to move the shaping machine 100 and the cutting machine 200 without moving the stage 300. Alternatively, the moving mechanism 400 may be configured to move the shaping machine 100 and the cutting machine 200 and the stage 300.

The control unit 500 is implemented by a computer including, for example, a processor, a main storage device, and an input and output interface for inputting and outputting signals to and from the outside. The control unit 500 performs various functions by, for example, executing a program read into the main storage device by the processor. The control unit 500 controls the shaping machine 100, the cutting machine 200, and the moving mechanism 400. The control unit 500 may be implemented by a combination of a plurality of circuits instead of the computer.

The information processing device 510 is coupled to the control unit 500. The information processing device 510 is implemented by a computer including, for example, a processor, a main storage device, and an input and output interface for inputting and outputting signals to and from the outside. The information processing device 510 performs various functions by, for example, executing a program read into the main storage device by the processor. The information processing device 510 includes a data generation unit 512. As described later, the data generation unit 512 generates shaping data and cutting data for controlling the shaping machine 100, the cutting machine 200, and the moving mechanism 400 by the control unit 500.

Figure 2:
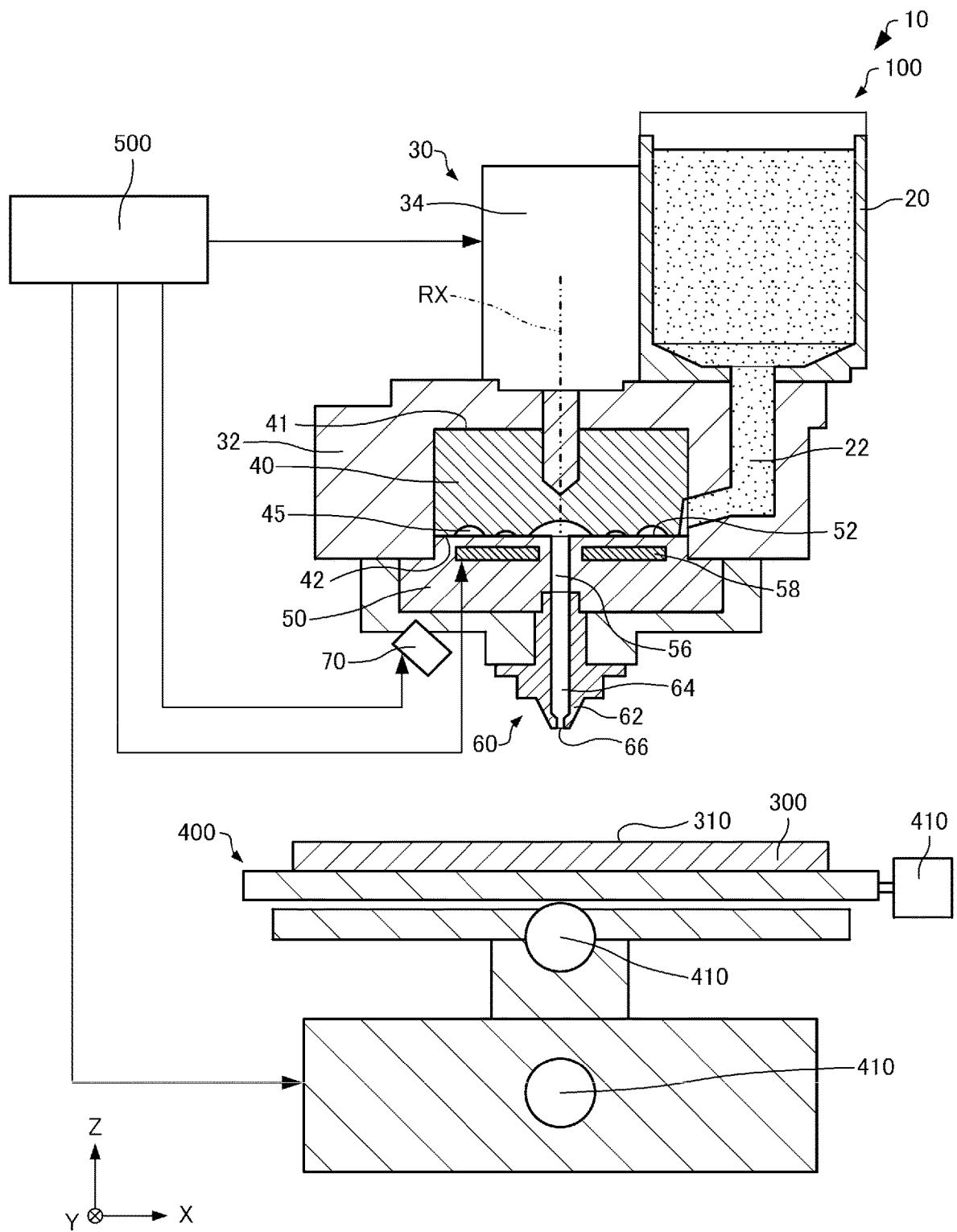
FIG. 2 is a cross-sectional view schematically showing a shaping machine of the three-dimensional shaping device according to the present embodiment.

Here, FIG. 2 is a cross-sectional view schematically showing the shaping machine 100. As shown in FIG. 2, the shaping machine 100 includes, for example, a material supply unit 20, a melting unit 30, a discharge unit 60, and a reheating unit 70.

A material in a form of pellets or powder is charged into the material supply unit 20. Examples of the material in the form of pellets include acrylonitrile butadiene styrene (ABS). The material supply unit 20 is implemented by, for example, a hopper. The material supply unit 20 and the melting unit 30 are coupled by a supply path 22 provided below the material supply unit 20. The material charged into the material supply unit 20 is supplied to the melting unit 30 via the supply path 22.

The melting unit 30 includes, for example, a screw case 32, a drive motor 34, a flat screw 40, and a barrel 50. The melting unit 30 melts a solid-state material supplied from the material supply unit 20, converts the material into a shaping material in a form of paste having fluidity, and supplies the material to the nozzle 62.

The flat screw 40 is accommodated in the screw case 32. A drive motor 34 is fixed to an upper surface of the screw case 32.

The flat screw 40 has a substantially columnar shape whose height in a direction of a central axis RX is smaller than a diameter of the flat screw 40. In the illustrated example, the flat screw 40 is disposed in the screw case 32 such that the central axis RX is parallel to the Z axis. The flat screw 40 rotates about the central axis RX by a torque generated by the drive motor 34.

Figure 3:
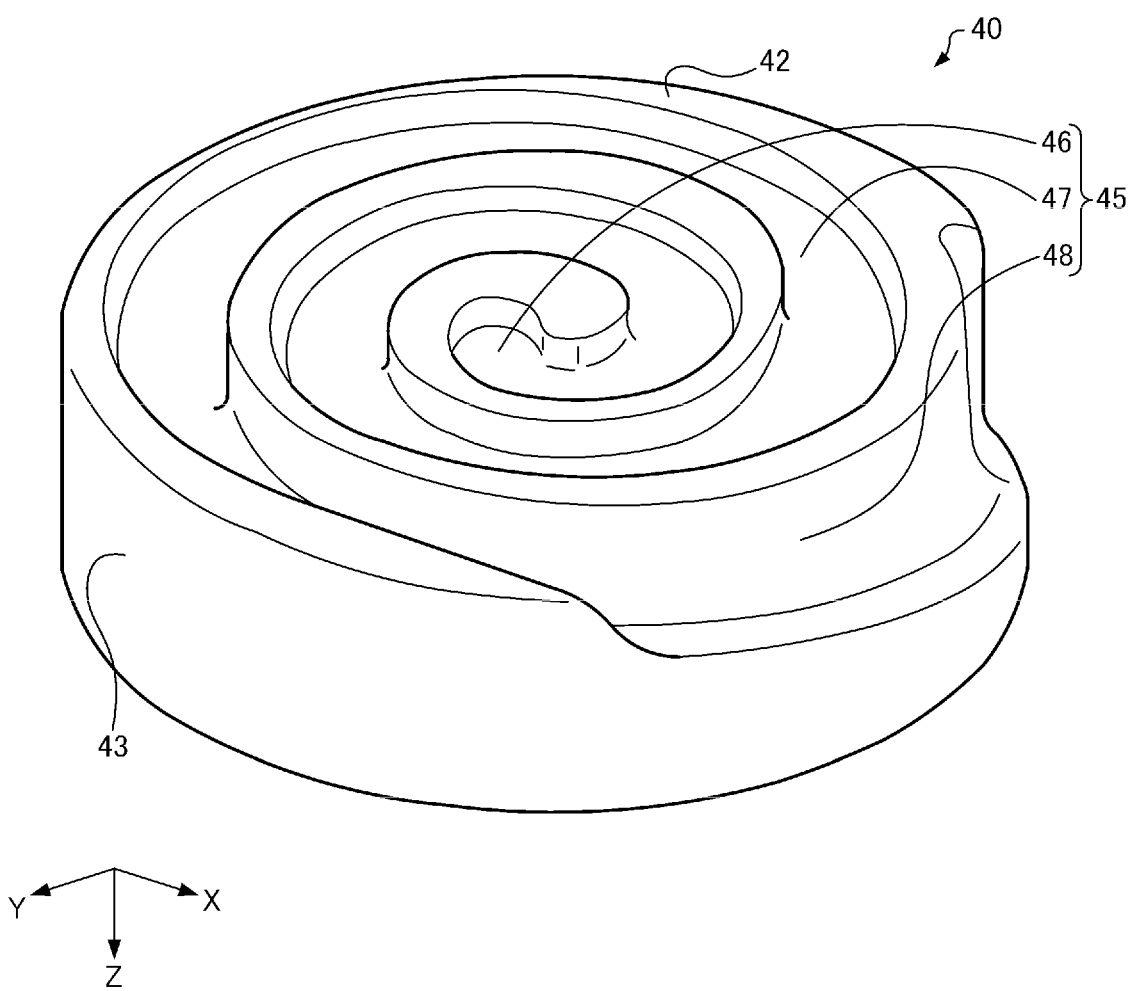
FIG. 3 is a perspective view schematically showing a flat screw of the three-dimensional shaping device according to the present embodiment.

The flat screw 40 includes a groove forming surface 42 on a side opposite to an upper surface 41. A groove portion 45 is provided in the groove forming surface 42. Here, FIG. 3 is a perspective view schematically showing the flat screw 40. For convenience, FIG. 3 shows a state in which a vertical positional relationship is reversed from a state shown in FIG. 2.

As shown in FIG. 3, the groove portion 45 of the flat screw 40 includes, for example, a central portion 46, a vortex portion 47, and a material introduction portion 48.

The central portion 46 is a circular recess formed around the central axis RX of the flat screw 40. The central portion 46 faces a communication hole 56 provided in the barrel 50.

The vortex portion 47 is a groove that extends spirally so as to draw an arc towards an outer periphery of the groove forming surface 42, with the central portion 46 as a center. The vortex portion 47 may extend in an involute curve shape or a spiral shape. One end of the vortex portion 47 is coupled to the central portion 46. The other end of the vortex portion 47 is coupled to the material introduction portion 48.

The material introduction portion 48 is a groove that is provided at an outer peripheral edge of the groove forming surface 42 and wider than the vortex portion 47. The material introduction portion 48 continues to a side surface 43 of the flat screw 40. The material introduction portion 48 introduces the material supplied from the material supply unit 20 via the supply path 22 into the vortex portion 47.

In the example shown in FIG. 3, one vortex portion 47 and one material introduction portion 48 are provided from the central portion 46 toward the outer periphery, but a plurality of vortex portions 47 and a plurality of material introduction portions 48 may be provided from the central portion 46 toward the outer periphery.

As shown in FIG. 2, the barrel 50 is provided below the flat screw 40. The barrel 50 includes a screw facing surface 52 that faces the groove forming surface 42 of the flat screw 40. A heater 58 is provided in the barrel 50. A temperature of the heater 58 is controlled by the control unit 500. A position of the heater 58 is not particularly limited as long as the shaping material can be heated, and the heater 58 may be provided in the flat screw 40, or may be provided outside the flat screw 40 and the barrel 50.

The communication hole 56 is provided at a center of the screw facing surface 52 of the barrel 50. The communication hole 56 communicates with a nozzle flow path 64. Here, FIG. 4 is a plan view schematically showing the barrel 50.

Figure 4:
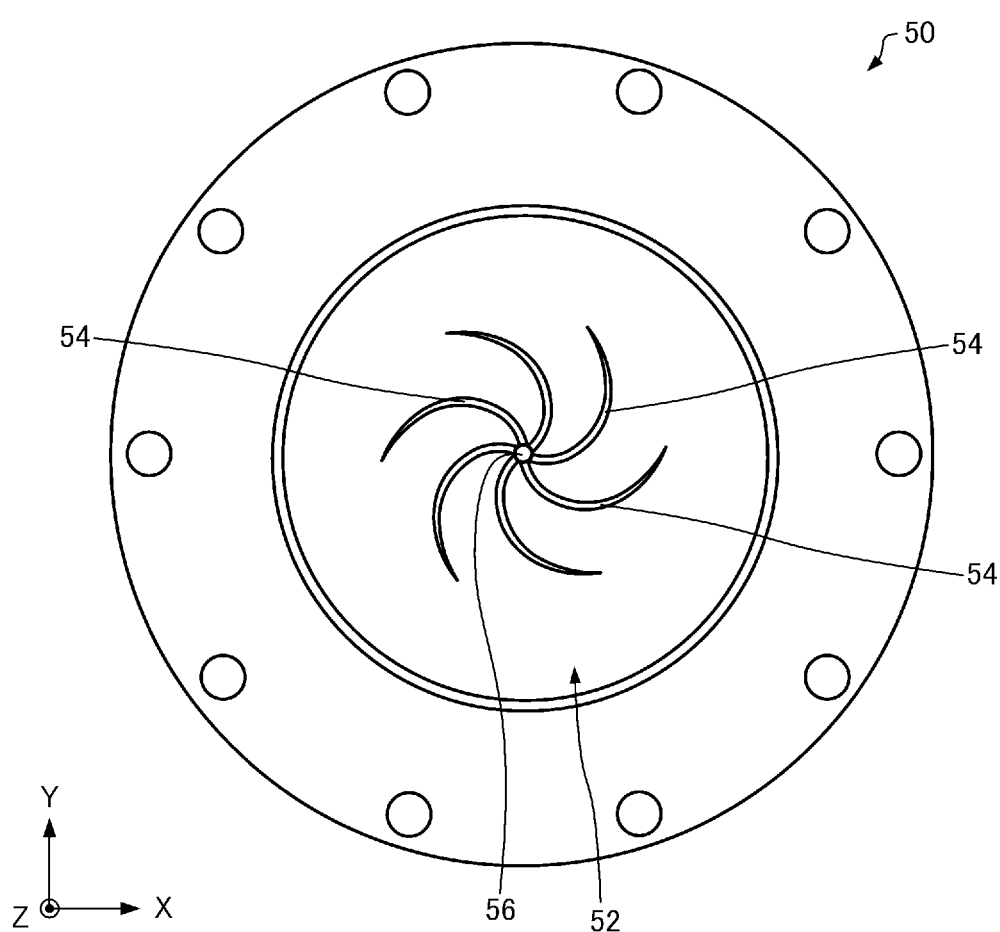
FIG. 4 is a plan view schematically showing a barrel of the three-dimensional shaping device according to the present embodiment.

As shown in FIG. 4, guide grooves 54 and the communication hole 56 are provided at the screw facing surface 52 of the barrel 50. A plurality of guide grooves 54 is provided. The plurality of guide grooves 54 are provided around the communication hole 56 in a plan view (as viewed from the Z-axis direction). One end of the guide groove 54 is coupled to the communication hole 56, and extends spirally from the communication hole 56 toward an outer periphery of the screw facing surface 52. The guide groove 54 has a function of guiding the shaping material to the communication hole 56. The guide groove 54 may not be provided.

As shown in FIG. 2, the discharge unit 60 includes the nozzle 62. The nozzle 62 is provided with the nozzle flow path 64 and a nozzle hole 66. The nozzle flow path 64 communicates with the communication hole 56 of the melting unit 30. The nozzle hole 66 communicates with the nozzle flow path 64. The nozzle hole 66 is an opening provided in a tip end portion of the nozzle 62. A planar shape of the nozzle hole 66 is, for example, a circle. The shaping material supplied from the melting unit 30 to the nozzle 62 is discharged through the nozzle hole 66.

The reheating unit 70 re-heats the shaping material that is stacked and cured on the stage 300. The reheating unit 70 is, for example, a heater provided in the vicinity of the nozzle 62. A temperature of the reheating unit 70 is controlled by the control unit 500.

In FIG. 2, three motors 410 of the moving mechanism 400 are shown. The moving mechanism 400 moves the stage 300 in the X-axis direction, the Y-axis direction, and the Z-axis direction by the three motors 410. For convenience, in FIG. 1, the moving mechanism 400 is shown in a simplified manner.

1.2. Data Generation Processing

The shaping data and the cutting data generated by a data generation processing is data for the control unit 500 to control the shaping machine 100, the cutting machine 200, and the moving mechanism 400. The data generation processing is executed by the data generation unit 512 of the information processing device 510.

The shaping data is used to shape the three-dimensional shaped object OB. The shaping data is data for controlling the shaping machine 100 and the moving mechanism 400. The cutting data is used for cutting the three-dimensional shaped object OB. The cutting data is data for controlling the cutting machine 200 and the moving mechanism 400.

Figure 5:
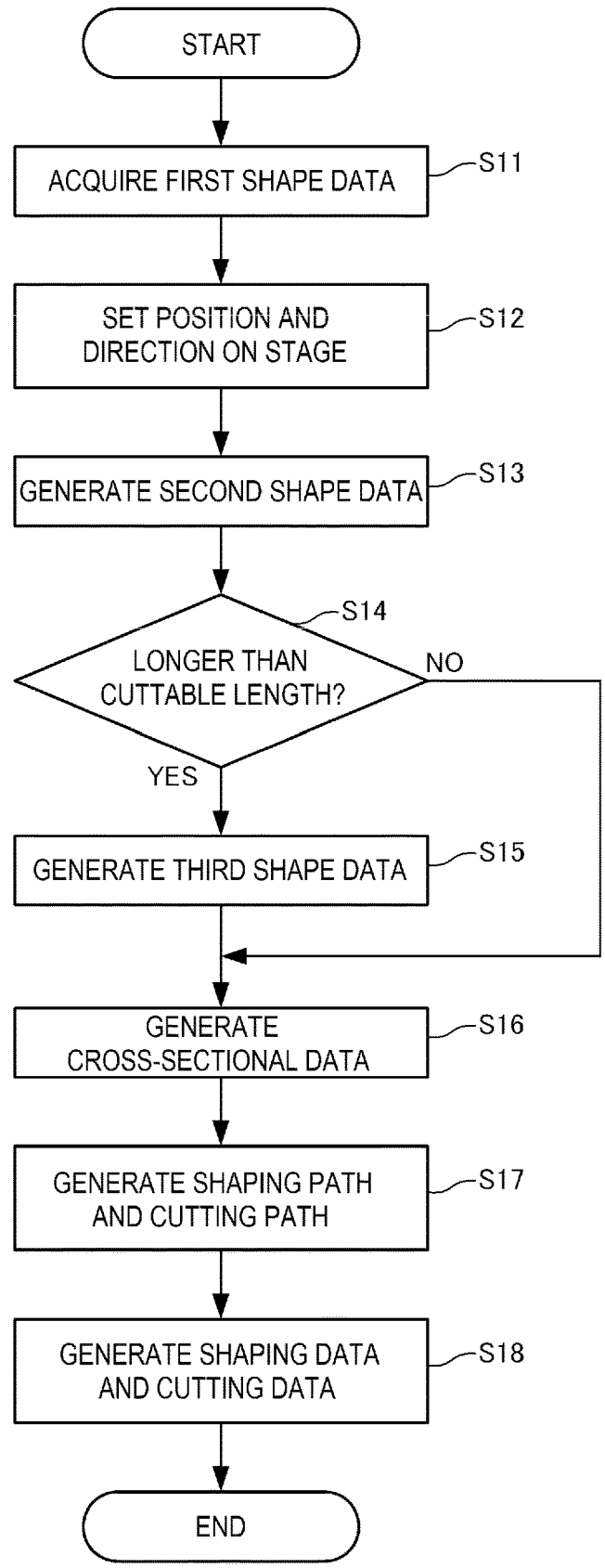
FIG. 5 is a flowchart showing a data generation processing of the three-dimensional shaping device according to the present embodiment.

FIG. 5 is a flowchart showing the data generation processing in the data generation unit 512. The data generation unit 512 starts the data generation processing when the information processing device 510 receives a predetermined start operation. Hereinafter, each step of the data generation processing will be described in order.

1.2.1. Step S11

Figure 6:
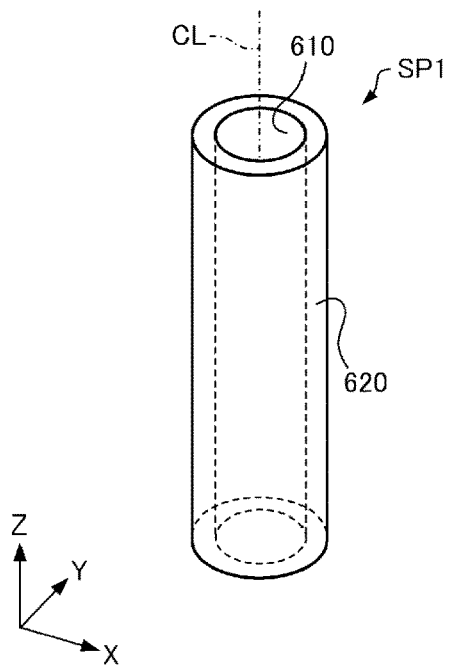
FIG. 6 is a perspective view schematically showing a first shape of the three-dimensional shaping device according to the present embodiment.

First, as shown in FIG. 5, the data generation unit 512 acquires first shape data (step S11). Here, FIG. 6 is a perspective view schematically showing a first shape SP1 represented by the first shape data.

The first shape SP1 is, for example, a shape representing the three-dimensional shaped object OB created using three-dimensional computer-aided design (CAD) software, three-dimensional computer graphics (CG) software, or the like. The first shape SP1 is a design shape of the three-dimensional shaped object OB. The first shape data is, for example, data in a standard triangulated language (STL) format, an initial graphics exchange specification (IGES) format, a standard for the exchange of product (STEP) format, or the like.

The data generation unit 512 acquires the first shape data created by the information processing device 510 using, for example, the three-dimensional CAD software. The data generation unit 512 may acquire the first shape data created outside the information processing device 510 via a recording medium such as a universal serial bus (USB) memory. In the example shown in FIG. 6, the first shape SP1 has a tubular shape. The first shape SP1 has an inner wall surface 610 and a surface 620 on an opposite side of the inner wall surface 610.

1.2.2. Step S12

Next, as shown in FIG. 5, the data generation unit 512 sets a position and a direction in which the three-dimensional shaped object OB represented by the first shape SP1 is to be disposed on the stage 300 (step S12).

Specifically, the data generation unit 512 sets a position and a direction in which the first shape SP1 is to be disposed on the stage 300 according to a position and a direction designated by a user. In the example shown in FIG. 6, the position and the direction of the first shape SP1 on the stage 300 are set such that a central axis CL of the first shape SP1 is parallel to the Z axis.

1.2.3. Step S13

Figure 7:
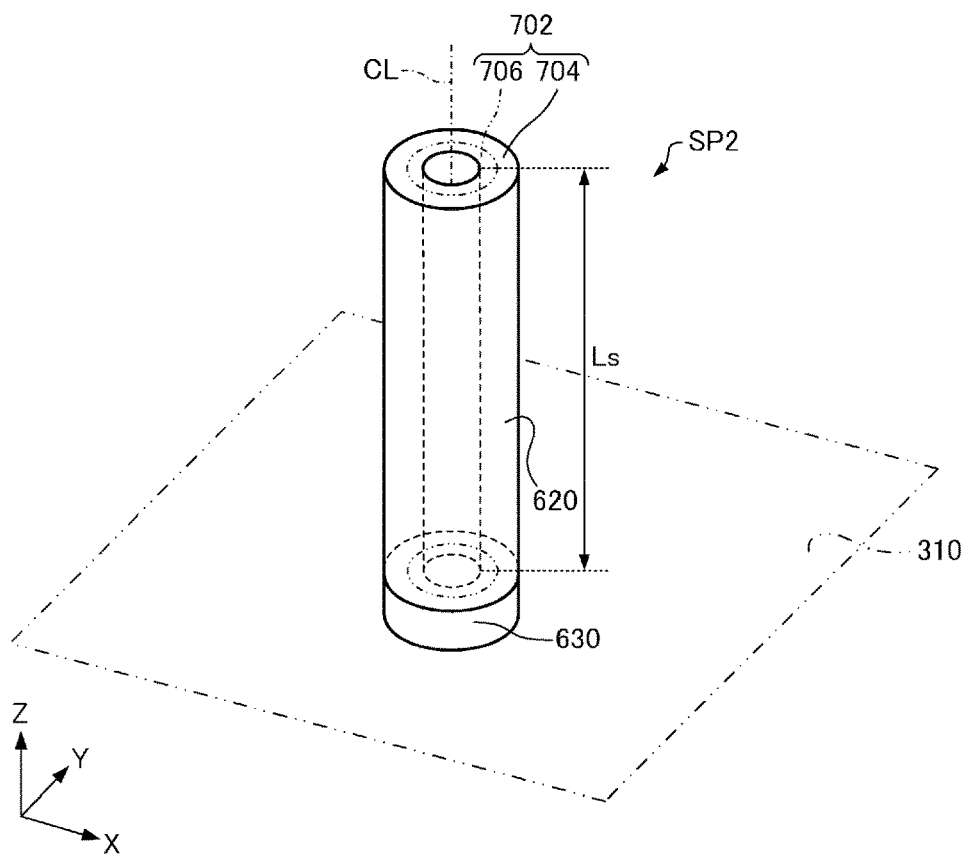
FIG. 7 is a perspective view schematically showing a second shape of the three-dimensional shaping device according to the present embodiment.

Next, as shown in FIG. 5, the data generation unit 512 uses the first shape data and information on a cutting process to be applied to the three-dimensional shaped object OB to generate second shape data in which a second shape is represented (step S13). The information on the cutting process to be applied to the three-dimensional shaped object OB is, for example, information input by the user to the information processing device 510. Here, FIG. 7 is a perspective view schematically showing a second shape SP2 represented by the second shape data. For convenience, in FIG. 7, the shaping surface 310 of the stage 300 is indicated by a two-dot chain line.

As shown in FIG. 7, the second shape SP2 is, for example, a shape of the three-dimensional shaped object OB to which a cut portion 706 is added to the first shape SP1. A portion included in the first shape SP1 and included in the second shape SP2 is also referred to as a main body portion 704. The main body portion 704 and the cut portion 706 are collectively referred to as a shaping portion 702.

The cut portion 706 is a cutting margin for performing the cutting process on the three-dimensional shaped object OB. For example, the data generation unit 512 disposes the cut portion 706 according to a position and a dimension of the cutting process designated by the user. In the illustrated example, the cut portion 706 is disposed on the inner wall surface 610.

In the illustrated example, a raised portion 630 is disposed between the shaping portion 702 and the stage 300. The raised portion 630 is a portion that separates the cut portion 706 from the stage 300. The raised portion 630 can prevent interference with the stage 300 when the cutting machine 200 performs a cutting process on the three-dimensional shaped object OB. The data generation unit 512 disposes the raised portion 630 at a position designated by the user, for example. When the cut portion 706 is removed from the shaping portion 702 shaped according to the second shape SP2 by the cutting process, the data generation unit 512 may determine whether the cutting machine 200 interferes with the stage 300. When it is determined that the cutting machine 200 interferes with the stage 300, the data generation unit 512 may dispose the raised portion 630.

1.2.4. Step S14

Next, as shown in FIGS. 5 and 7, the data generation unit 512 determines whether a length Ls of the cut portion 706 in a cutting direction (−Z axis direction) is longer than a cuttable length (first length) Le of the cutting tool 210 in the −Z axis direction (step S14).

Specifically, the data generation unit 512 uses the second shape data and information on the cutting tool 210 to determine whether the length Ls of the cut portion 706 is longer than the cuttable length Le of the cutting tool 210.

The cuttable length Le is a maximum length that is cuttable in the cutting direction in the cutting tool 210. For example, when the cutting tool 210 is inserted into a hollow portion from one end of a tube whose central axis is disposed along the Z axis to cut a cutting margin provided on the inner wall surface 610 of the tube, a distance from one end of the tube to a cuttable limit position in the Z-axis direction is the cuttable length Le of the cutting tool 210 in the cutting direction. The cutting direction is a direction opposite to a stacking direction of the shaping material.

1.2.5. Step S15

When it is determined that the length Ls of the cut portion 706 is longer than the cuttable length Le of the cutting tool 210 ("YES" in step S14), as shown in FIG. 5, the data generation unit 512 uses the second shape data to generate third shape data in which a third shape SP3 is represented (step S15). Here, FIG. 8 is a perspective view schematically showing the third shape SP3 represented by the third shape data.

Figures 8, 9:
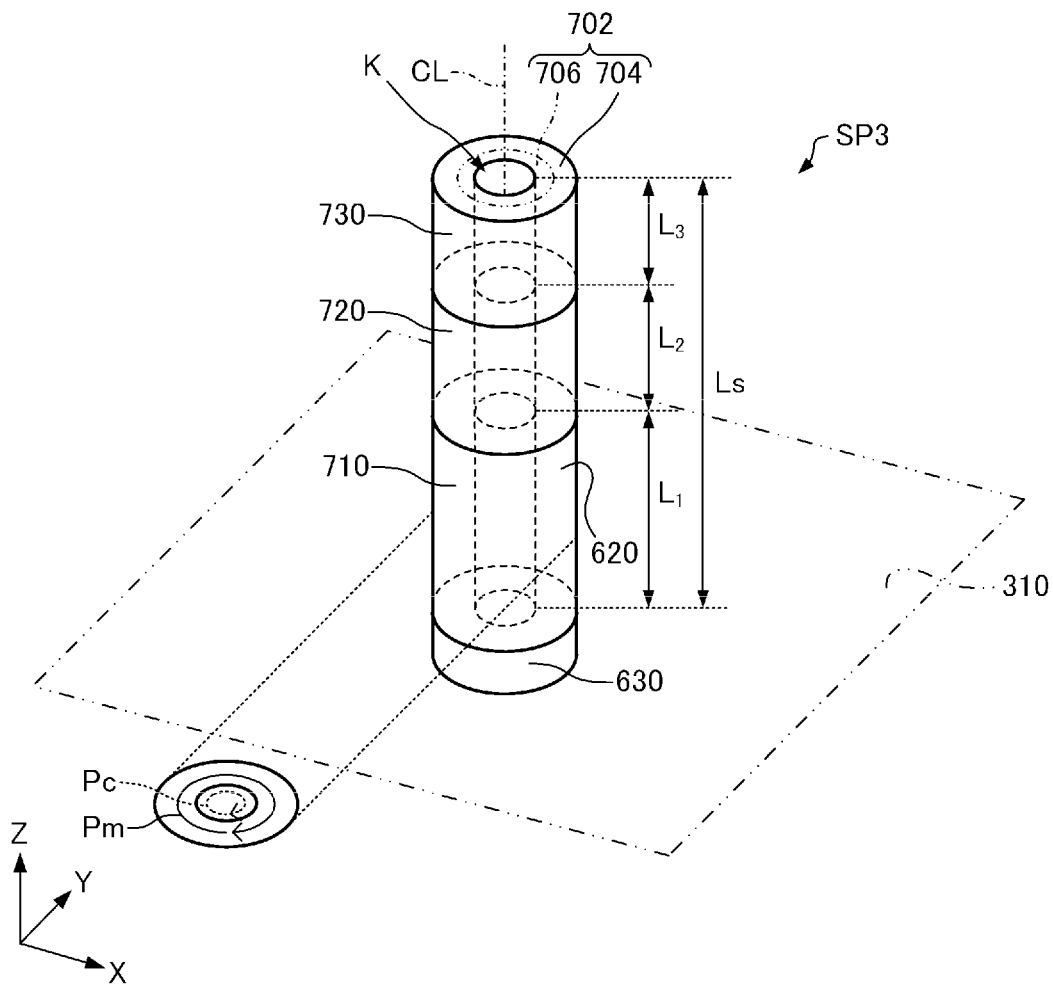
FIG. 8 is a perspective view schematically showing a third shape of the three-dimensional shaping device according to the present embodiment.
FIG. 9 is a diagram schematically showing a first shaping data portion and a first cutting data portion of the three-dimensional shaping device according to the present embodiment.

As shown in FIG. 8, the third shape SP3 is a shape of the three-dimensional shaped object OB divided into a plurality of portions. The data generation unit 512 divides the shaping portion 702 of the second shape SP2 such that a length of each portion in the Z-axis direction is shorter than the cuttable length Le of the cutting tool 210 to set the third shape SP3. In the illustrated example, the data generation unit 512 divides the shaping portion 702 of the second shape SP2 into a first portion 710, a second portion 720, and a third portion 730 to generate the third shape SP3.

The first portion 710 is disposed between the stage 300 and the second portion 720. The second portion 720 is disposed between the first portion 710 and the third portion 730. A length $L_1$ of the first portion 710 in the −Z axis direction, a length $L_2$ of the second portion 720 in the −Z axis direction, and a length $L_3$ of the third portion 730 in the −Z axis direction are shorter than the cuttable length Le of the cutting tool 210 in the −Z axis direction.

The length $L_2$ of the second portion 720 in the −Z axis direction is shorter than the length $L_1$ of the first portion 710 in the −Z axis direction. The length $L_3$ of the third portion 730 in the −Z axis direction is shorter than the length $L_2$ of the second portion 720 in the −Z axis direction. Thus, the data generation unit 512 sets a plurality of portions such that the length of each portion in the −Z axis direction becomes shorter as a distance from the stage 300 increases.

Here, a contraction force w of the second portion 720 satisfies the following Expression (1), where the length of the first portion 710 in the −Z-axis direction is $L_1$, a Young's modulus of the first portion 710 is E, and a moment of inertia of area of the first portion 710 is I. The moment of inertia of area can be determined by a known method based on a shape of a cross section of the first portion 710.

$$w \leq 0.009 EI/L_1^3 \qquad (1)$$

Generally, a relationship of the following Expression (2) is satisfied by a formula of a cantilever concentrated load, where an amount of displacement is δ.

$$\delta = w L_1^3 / 3EI \qquad (2)$$

When a step occurs at a boundary between the first portion 710 and the second portion 720 on the surface 620, the step corresponds to δ in the Expression (2). Here, a roughness of the surface 620 at the first portion 710 is 0.003 mm when the first portion 710 is cut by the cutting tool 210. Therefore, if the Expression (1) is satisfied, even if the step occurs at the boundary between the first portion 710 and the second portion 720 on the surface 620, a height of the step can be reduced to be 0.003 mm or less.

A total length of the first portion 710 and the second portion 720 is longer than the cuttable length Le in the −Z axis direction. A total length of the second portion 720 and the third portion 730 is longer than the cuttable length Le in the −Z axis direction, for example.

In a plan view, the first portion 710, the second portion 720, and the third portion 730 are shaped to surround a space K. In the plan view, the first portion 710, the second portion 720, and the third portion 730 are annular, for example.

When it is determined that the length Ls of the cut portion 706 is not longer than the cuttable length Le of the cutting tool 210 ("NO" in step S14), the data generation unit 512 omits the processing of step S15 and proceeds to the next processing.

1.2.6. Step S16

Next, as shown in FIG. 5, the data generation unit 512 uses the third shape data to generate cross-sectional data (step S16).

The cross-sectional data is data representing a cross-sectional shape when the third shape SP3 is cut along a plane parallel to the shaping surface 310 of the stage 300. The data generation unit 512 cuts the third shape SP3 at intervals corresponding to a thickness of one layer of the shaping material stacked on the stage 300 by the three-dimensional shaping device 10, and generates a plurality of pieces of cross-sectional data. The thickness of one layer of the shaping material stacked on the stage 300 by the three-dimensional shaping device 10 is set by the user, for example. When the third shape data is not generated by omitting step S15, the data generation unit 512 uses the second shape data to generate the cross-sectional data.

1.2.7. Step S17

Next, as shown in FIG. 5, the data generation unit 512 uses the cross-sectional data to generate a shaping path, and uses the third shape data to generate a cutting path (step S17). FIG. 8 schematically shows a shaping path Pm and a cutting path Pc generated by the data generation unit 512.

As shown in FIG. 8, the shaping path Pm is a scanning path of, with respect to the stage 300, the nozzle 62 that moves while discharging the shaping material. The cutting path Pc is a scanning path of, with respect to the stage 300, the cutting tool 210 that moves while cutting the stacked shaping material. A plurality of shaping paths Pm and cutting paths Pc are generated, for example, in accordance with the number of stacked layers of the shaping material in the three-dimensional shaped object OB.

1.2.8. Step S18

Next, as shown in FIG. 5, the data generation unit 512 generates and outputs the shaping data and the cutting data (step S18). The data generation unit 512 generates and outputs the shaping data and the cutting data represented by, for example, a G-code, an M-code, or the like.

The shaping data includes information on the shaping path Pm. Further, the shaping data includes, for example, information on a discharge amount, which is a flow rate of the shaping material discharged from the nozzle 62, a rotation speed of the drive motor 34 for rotating the flat screw 40, the temperature of the heater 58 provided in the barrel 50, and the temperature of the reheating unit 70. These pieces of information are set by the user, for example.

The cutting data includes information on the cutting path Pc. Further, the cutting data includes, for example, information on a rotation speed of the cutting tool 210 and a feed speed of the cutting tool 210. These pieces of information are set by the user, for example.

The shaping data and the cutting data are represented, for example, in one piece of data. The data includes, for example, a raised portion shaping data portion, a raised portion cutting data portion, a first shaping data portion, a first cutting data portion, a second shaping data portion, a second cutting data portion, a third shaping data portion, and a third cutting data portion.

The raised portion shaping data portion, the first shaping data portion, the second shaping data portion, and the third shaping data portion are data for shaping the raised portion 630, the first portion 710, the second portion 720, and the third portion 730, respectively. The raised portion cutting data portion, the first cutting data portion, the second cutting data portion, and the third cutting data portion are data for cutting the raised portion 630, the first portion 710, the second portion 720, and the third portion 730, respectively.

The raised portion shaping data portion, the raised portion cutting data portion, the first shaping data portion, the first cutting data portion, the second shaping data portion, the second cutting data portion, the third shaping data portion, and the third cutting data portion are set in this order.

Here, FIG. 9 is a diagram schematically showing a first shaping data portion Dm1 and a first cutting data portion Dc1 generated by the data generation unit 512. The shaping data and the cutting data is read and interpreted in an order from top to bottom in FIG. 9.

As shown in FIG. 9, for example, a command COM1, a command COM2, a command COM3, and a command COM4 are set in the first shaping data portion Dm1.

The command COM1 moves the nozzle 62 to coordinates (X, Y, Z)=(55, 50, 20). The coordinates represent a relative position of the nozzle 62 with respect to the stage 300. The command COM2 moves the nozzle 62 from the coordinates (X, Y, Z)=(55, 50, 20) to coordinates (X, Y, Z)=(50, 55, 20), and discharges the shaping material in an amount of 10 units from the nozzle 62 while the nozzle 62 moves in the section. The command COM3 moves the nozzle 62 from the coordinates (X, Y, Z)=(50, 55, 20) to coordinates (X, Y, Z)=(45, 60, 20), and discharges the shaping material in an amount of 10 units from the nozzle 62 while the nozzle 62 moves in the section. The description is omitted for the command COM3 and the command COM4, and then the command COM4 ends shaping of the first portion 710.

A command COM5, a command COM6, and a command COM7 are set in the first cutting data portion Dc1, for example.

The command COM5 moves the cutting tool 210 to coordinates (X, Y, Z)=(55, 60, 20). The command COM6 moves the cutting tool 210 from the coordinates (X, Y, Z)=(55, 60, 20) to coordinates (X, Y, Z)=(50, 55, 20) at a feed speed of an amount of 10 units. Thereafter, the command COM7 ends cutting of the first portion 710.

Then, as shown in FIG. 5, the data generation unit 512 ends the data generation processing.

2. Method of Manufacturing Three-Dimensional Shaped Object

2.1. Each Step

Figure 10:
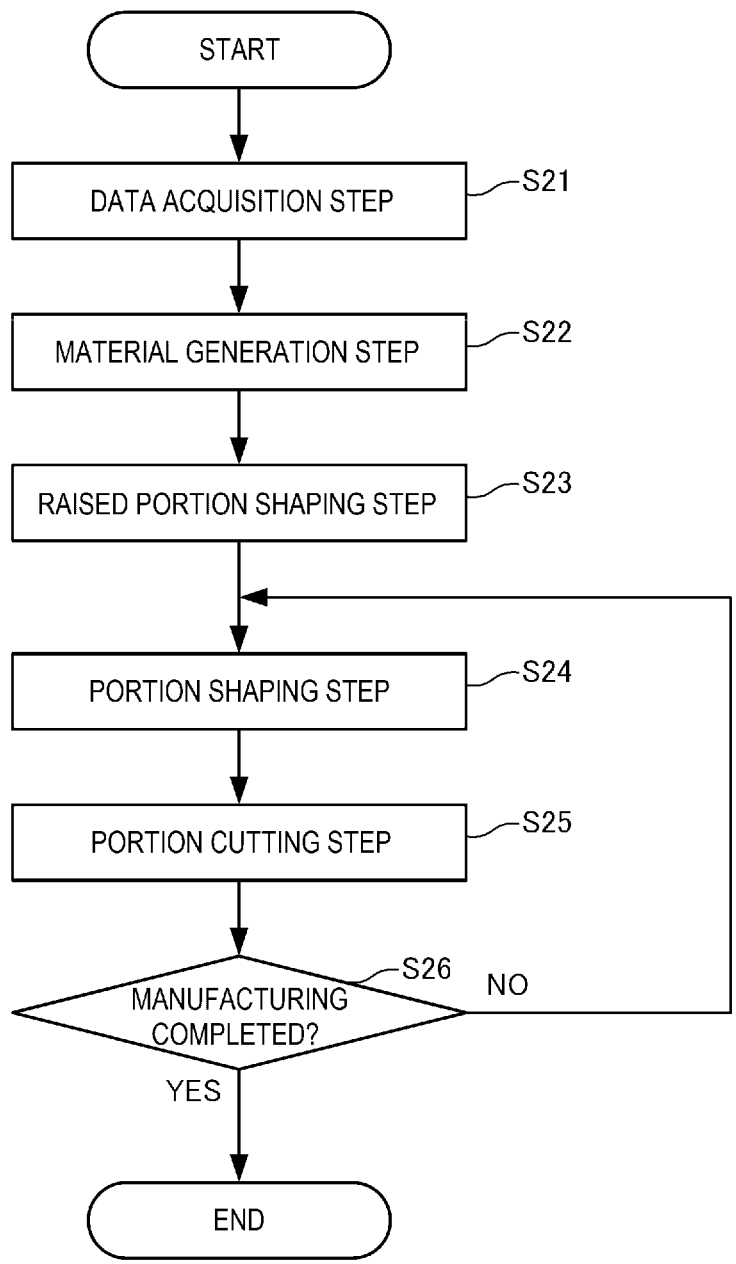
FIG. 10 is a flowchart showing a processing for implementing manufacturing of a three-dimensional shaped object according to the present embodiment.

Next, a method of manufacturing a three-dimensional shaped object OB according to the present embodiment will be described with reference to the drawings. FIG. 10 is a flowchart showing a processing for implementing the manufacturing of the three-dimensional shaped object OB according to the present embodiment. The processing is executed by the control unit 500 when a predetermined start operation is performed by the user on an operation panel or the information processing device 510 provided in the three-dimensional shaping device 10, for example. Hereinafter, each step of the processing will be described in order.

2.1.1. Step S21

First, as shown in FIG. 10, as a data acquisition step, the control unit 500 performs a processing of acquiring the above shaping data and cutting data from the information processing device 510.

The control unit 500 acquires the shaping data and the cutting data from the information processing device 510 by, for example, wired communication. The control unit 500 may acquire the shaping data and the cutting data from the information processing device 510 using a wireless communication or a recording medium such as a USB memory.

2.1.2. Step S22

Next, as a material generation step, the control unit 500 controls, for example, the rotation of the flat screw 40 and the temperature of the heater 58 provided in the barrel 50 to melt the material to generate a shaping material.

In the material generation step, as shown in FIGS. 2 and 3, the material accommodated in the material supply unit 20 is supplied from the side surface 43 of the rotating flat screw 40 to the material introduction portion 48 via the supply path 22. The material supplied to the material introduction portion 48 is conveyed to the vortex portion 47 by the rotation of the flat screw 40. The material conveyed to the vortex portion 47 is melted by the rotation of the flat screw 40 and the heating of the heater 58 to generate the shaping material in the form of paste having fluidity. The generated shaping material is conveyed toward the central portion 46 by the vortex portion 47, and is supplied from the communication hole 56 to the nozzle 62. The shaping material continues to be generated while a shaping step described later is performed.

2.1.3. Step S23

Next, as a raised portion shaping step, the control unit 500 causes, according to the shaping data, the shaping machine 100 and the moving mechanism 400 to stack the shaping material on the stage 300 to shape the raised portion 630.

Specifically, the control unit 500 causes the shaping material to be discharged from the nozzle 62 toward the stage 300 while changing the relative position between the nozzle 62 of the shaping machine 100 and the stage 300 to shape the raised portion 630 on the stage 300.

2.1.4. Step S24

Next, as a portion shaping step, the control unit 500 causes, according to the shaping data, the shaping machine 100 and the moving mechanism 400 to shape a stacked body by stacking the shaping material on the raised portion 630. A length of the stacked body in the −Z axis direction is shorter than the cuttable length Le of the cutting tool 210 in the −Z axis direction.

First, in step S24, the control unit 500 causes the reheating unit 70 to heat the stacked body. The control unit 500 causes the reheating unit 70 to heat an end surface of the stacked body for a predetermined time. A heating time is set according to, for example, a type of the material and the temperature of the reheating unit 70. The control unit 500 sets the heating time using, for example, a map in which a relationship between the temperature of the reheating unit 70 and the heating time is expressed. The map can be set by examining a time until a temperature of the end surface of the stacked body reaches a predetermined temperature exceeding a glass transition point of the shaping material by a test performed in advance. The control unit 500 may set the heating time using a function, instead of the map, in which the relationship between the temperature of the reheating unit 70 and the heating time is expressed.

Next, the control unit 500 causes the shaping material to be discharged from the nozzle 62 of the shaping machine 100 toward the stage 300 while changing the relative position between the nozzle 62 and the stage 300 to shape the stacked body on the raised portion 630.

2.1.5. Step S25

Next, as a portion cutting step, the control unit 500 causes, according to the cutting data, the cutting machine 200 and the moving mechanism 400 to use the cutting tool 210 to cut a cutting margin provided on the stacked body in the −Z-axis direction.

Specifically, the control unit 500 brings the rotating cutting tool 210 into contact with the cutting margin of the stacked body while changing the relative position between the cutting tool 210 and the stage 300 to process the stacked body to a desired dimension or surface roughness.

2.1.6. Step S26

Next, the control unit 500 determines whether the manufacturing of the three-dimensional shaped object OB is completed.

The completion of the manufacturing of the three-dimensional shaped object OB means that after the shaping of the three-dimensional shaped object OB is completed according to the shaping path represented by the shaping data, the cutting of the three-dimensional shaped object OB is completed according to the cutting path represented by the cutting data. The control unit 500 uses the shaping data and the cutting data to determine whether the manufacturing of the three-dimensional shaped object OB is completed.

When it is determined that the manufacturing of the three-dimensional shaped object OB is completed ("YES" in step S26), the control unit 500 ends the processing.

When it is determined that the manufacturing of the three-dimensional shaped object OB is not completed ("NO" in step S26), the control unit 500 returns the processing to step S24 and repeats the processing from step S24 to step S26. The control unit 500 repeats the portion shaping step (step S24) and the portion cutting step (step S25) until it is determined in step S26 that the manufacturing of the three-dimensional shaped object OB is completed. The portion shaping step and the portion cutting step are performed at least twice.

As described above, stacked bodies are coupled along the Z axis, and the three-dimensional shaped object OB having a length in the −Z axis direction longer than the cuttable length Le of the cutting tool 210 is manufactured. Then, the control unit 500 ends the processing.

2.2. Portion Shaping Step and Portion Cutting Step

Next, details of the portion shaping step (step S24) and the portion cutting step (step S25) will be described with reference to the drawings. An example in which the portion shaping step and the portion cutting step are performed three times will be described below. The number of the portion shaping step and the portion cutting step is not particularly limited as long as it is twice or more times.

2.2.1. First Portion Shaping Step and First Portion Cutting Step

Figure 11:
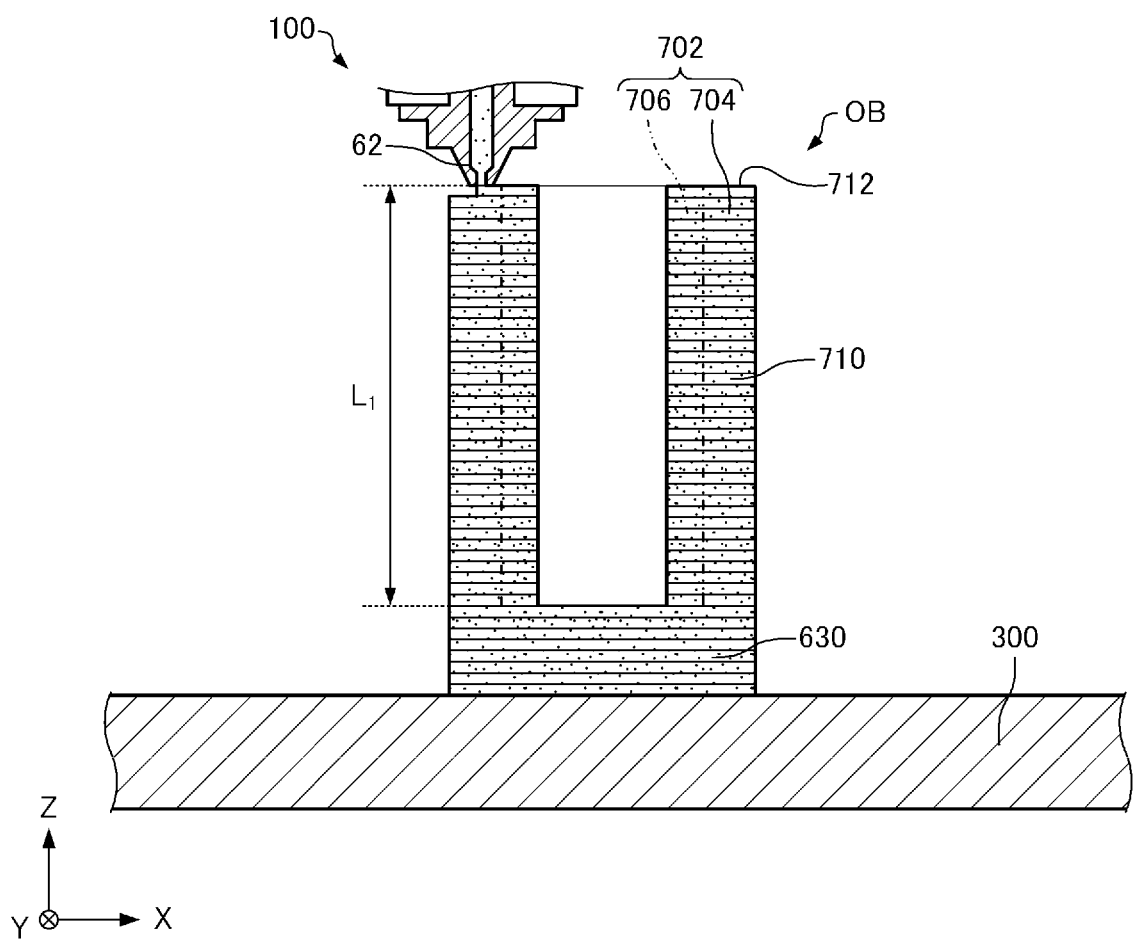
FIG. 11 is a cross-sectional view schematically showing a manufacturing step of the three-dimensional shaped object according to the present embodiment.

FIG. 11 is a cross-sectional view schematically showing a first portion shaping step. The first portion shaping step is a portion shaping step for the first time.

First, in the first portion shaping step, the raised portion 630 is heated. Specifically, the control unit 500 executes the processing of step S24 described above, and causes the reheating unit 70 to heat the raised portion 630.

Next, in the first portion shaping step, as shown in FIG. 11, the shaping material is stacked to shape the first portion 710 having the length $L_1$ in the −Z axis direction shorter than the cuttable length Le of the cutting tool 210 in the −Z axis direction. Specifically, in the first portion shaping step, the control unit 500 executes the processing of step S24 described above according to the shaping data, thereby causing the shaping machine 100 to stack the shaping material to shape the first portion 710 having the length $L_1$ shorter than the length Le.

The first portion 710 has a first end surface 712. The first end surface 712 is an end surface of the first portion 710 opposite to the stage 300. In the illustrated example, the first end surface 712 is an end surface on a side (+Z axis direction) opposite to the cutting direction (−Z axis direction). The first portion 710 shaped on the stage 300 is cured by being deprived of heat by, for example, the stage 300 or atmosphere. The first portion 710 includes the shaping portion 702 including the main body portion 704 and the cut portion 706.

In the illustrated example, before the first portion shaping step, the raised portion shaping step of stacking the shaping material on the stage 300 to shape the raised portion 630 that secures a distance between the first portion 710 and the stage 300 is performed. The raised portion shaping step and the first portion shaping step are continuously performed, for example. The first portion 710 is placed on the stage 300 via the raised portion 630.

Figure 12:
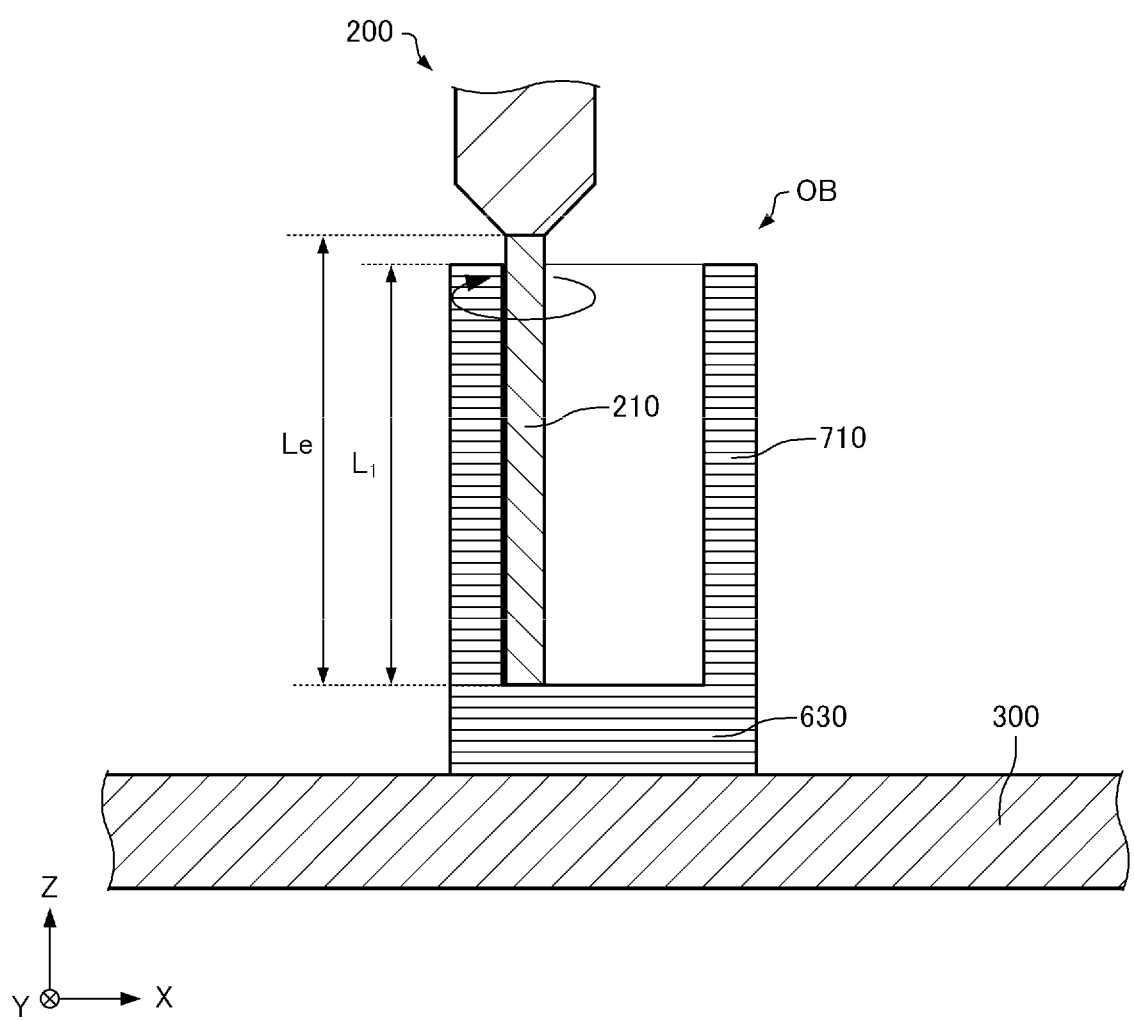
FIG. 12 is a cross-sectional view schematically showing a manufacturing step of the three-dimensional shaped object according to the present embodiment.

FIG. 12 is a cross-sectional view schematically showing a first portion cutting step. The first portion cutting step is a portion cutting step for the first time.

In the first portion cutting step, as shown in FIG. 12, the cutting tool 210 is used to cut the first portion 710 in the −Z axis direction. Specifically, in the first portion cutting step, the control unit 500 causes the cutting machine 200 to cut the cut portion 706 of the first portion 710 by executing the processing of step S25 described above according to the cutting data. In the illustrated example, the control unit 500 inserts the cutting tool 210 into a hollow portion of the first portion 710 having a tubular shape with the rotation axis of the cutting tool 210 along the Z axis. Then, the control unit 500 causes the cutting tool 210 to cut the cut portion 706 by bringing the rotating cutting tool 210 into contact with the cut portion 706 of the first portion 710.

2.2.2. Second Portion Shaping Step and Second Portion Cutting Step

Figure 13:
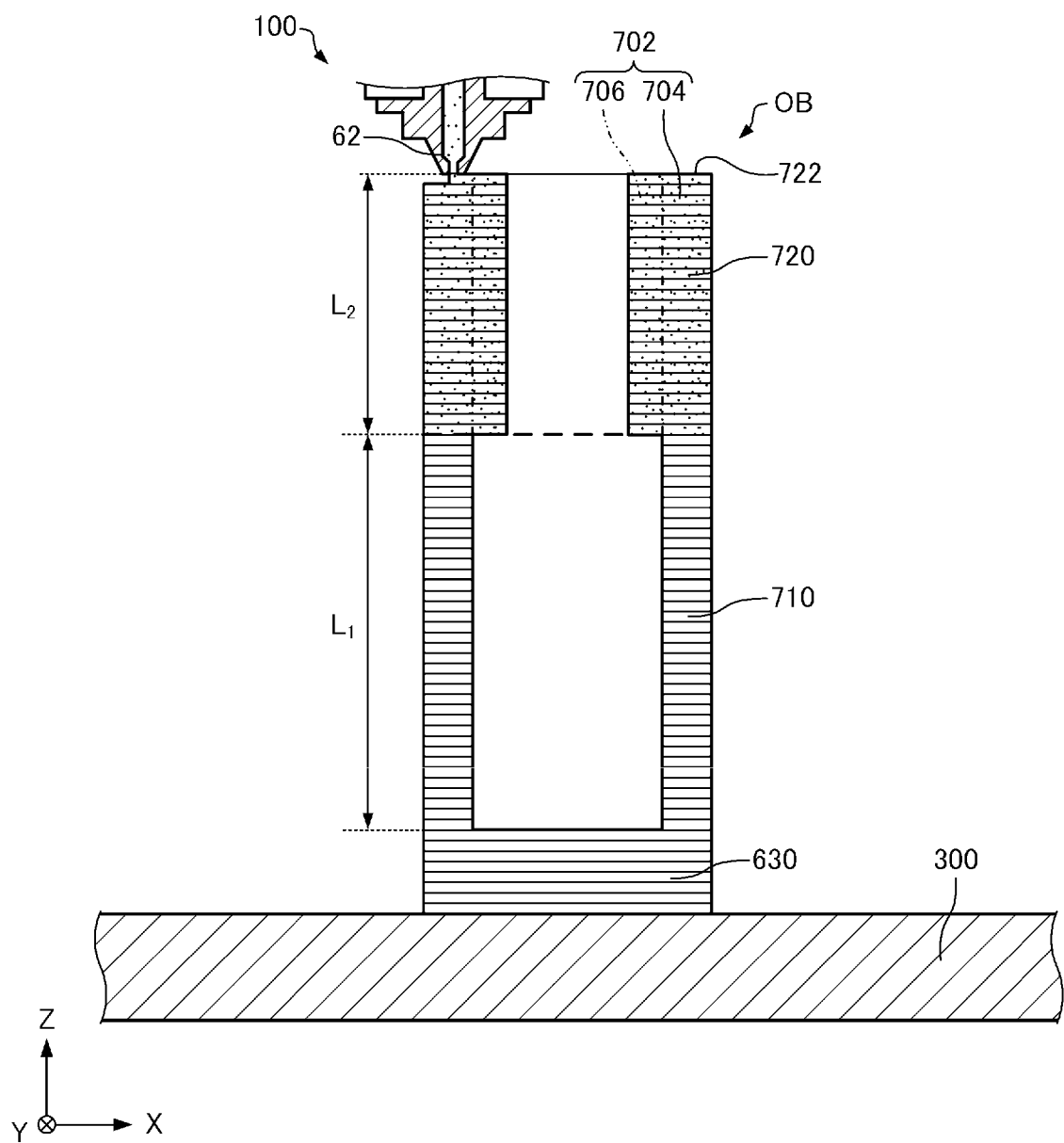
FIG. 13 is a cross-sectional view schematically showing a manufacturing step of the three-dimensional shaped object according to the present embodiment.

FIG. 13 is a cross-sectional view schematically showing a second portion shaping step. The second portion shaping step is a portion shaping step for the second time.

First, in the second portion shaping step, the first end surface 712 of the first portion 710 is heated. Specifically, the control unit 500 executes the processing of step S24 described above, and causes the reheating unit 70 to heat the first end surface 712. Thus, the second portion shaping step includes a heating step of heating the first end surface 712.

Next, in the second portion shaping step, as shown in FIG. 13, the shaping material is stacked to couple to the first end surface 712 of the first portion 710, and to shape the second portion 720 having the length $L_2$ in the −Z axis direction shorter than that of the first portion 710. Specifically, in the second portion shaping step, the control unit 500 executes the processing of step S24 described above according to the shaping data, thereby causing the shaping machine 100 to stack the shaping material on the first portion 710 to shape the second portion 720 having the length $L_2$ shorter than the length $L_1$.

The second portion 720 has a second end surface 722. The second end surface 722 is an end surface of the second portion 720 opposite to the stage 300. In the illustrated example, the second end surface 722 is an end surface on a side (+Z axis direction) opposite to the cutting direction (−Z axis direction).

Figure 14:
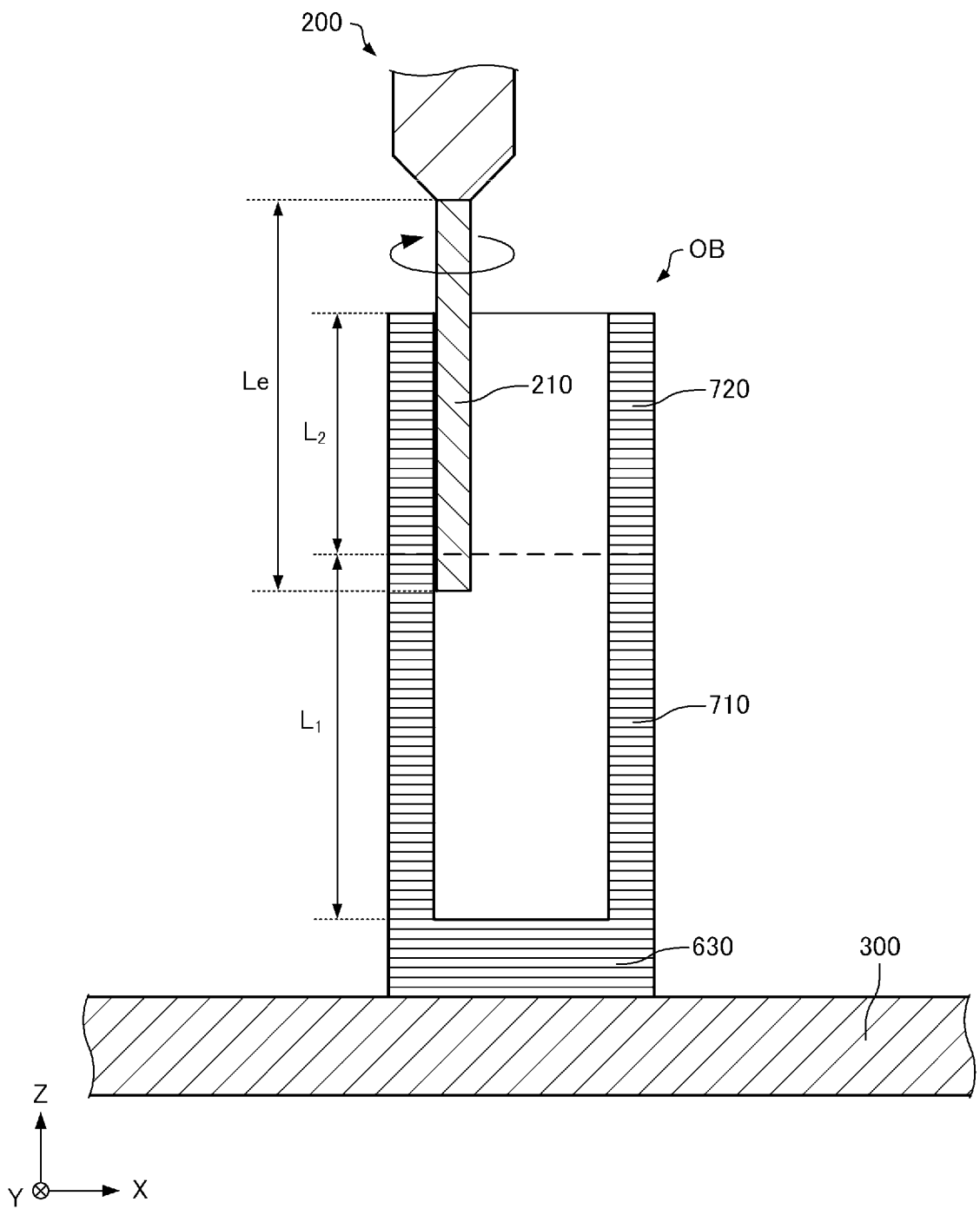
FIG. 14 is a cross-sectional view schematically showing a manufacturing step of the three-dimensional shaped object according to the present embodiment.

FIG. 14 is a cross-sectional view schematically showing a second portion cutting step. The second portion cutting step is a portion cutting step for the second time.

In the second portion cutting step, as shown in FIG. 14, the cutting tool 210 is used to cut the second portion 720 in the −Z axis direction. Specifically, in the second portion cutting step, the control unit 500 causes the cutting machine 200 to cut the cut portion 706 of the second portion 720 by executing the processing of step S25 described above according to the cutting data.

2.2.3. Third Portion Shaping Step and Third Portion Cutting Step

Figure 15:
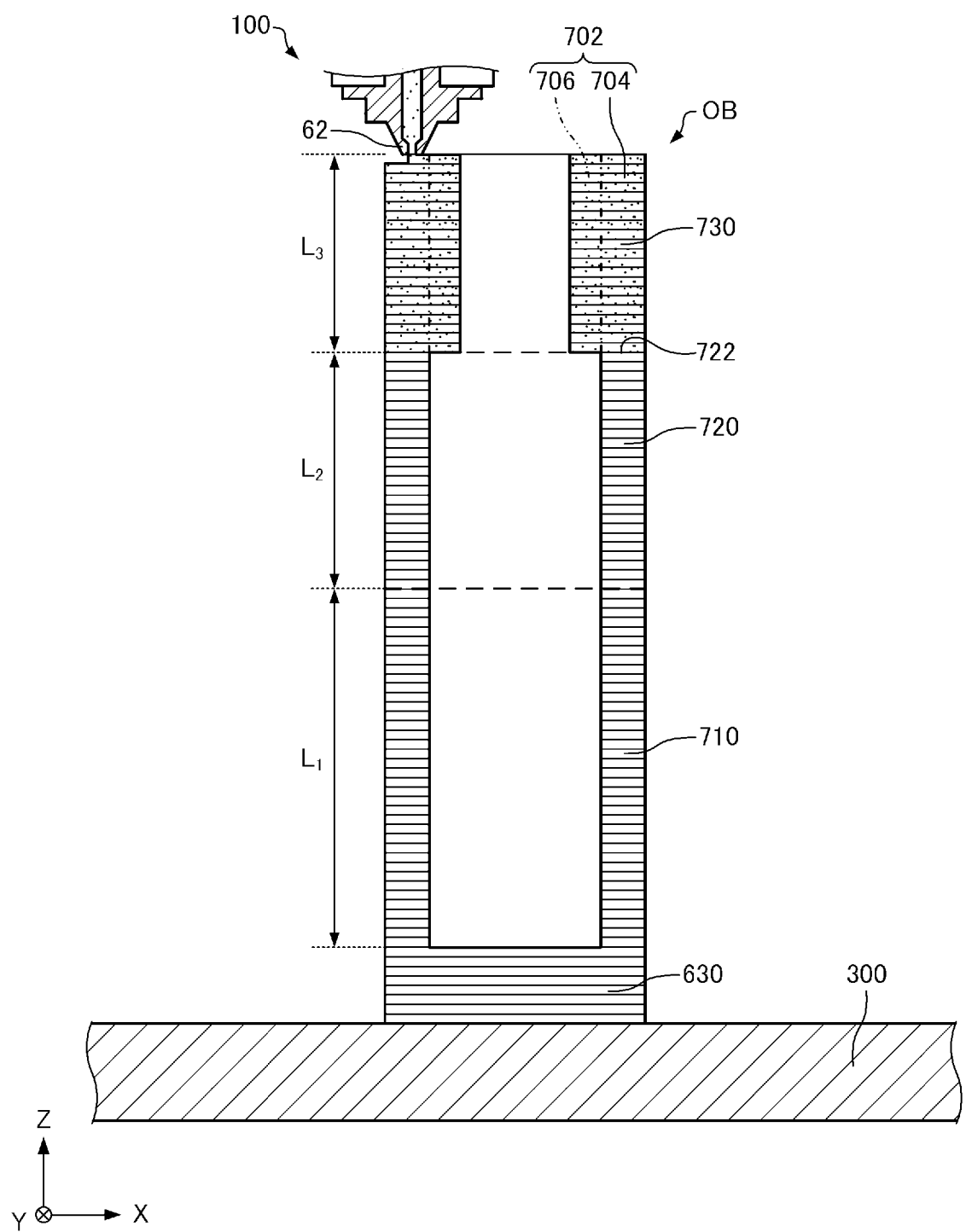
FIG. 15 is a cross-sectional view schematically showing a manufacturing step of the three-dimensional shaped object according to the present embodiment.

FIG. 15 is a cross-sectional view schematically showing a third portion shaping step. The third portion shaping step is a portion shaping step for the third time.

First, in the third portion shaping step, the second end surface 722 of the second portion 720 is heated. Specifically, the control unit 500 executes the processing of step S24 described above, and causes the reheating unit 70 to heat the second end surface 722.

Next, in the third portion shaping step, as shown in FIG. 15, the shaping material is stacked to couple to the second end surface 722 of the second portion 720, and to shape the third portion 730 having the length $L_3$ in the −Z axis direction shorter than that of the second portion 720. Specifically, in the third portion shaping step, the control unit 500 executes the processing of step S24 described above according to the shaping data, thereby causing the shaping machine 100 to stack the shaping material on the second portion 720 to shape the third portion 730 having the length $L_3$ shorter than the length $L_2$.

Figure 16:
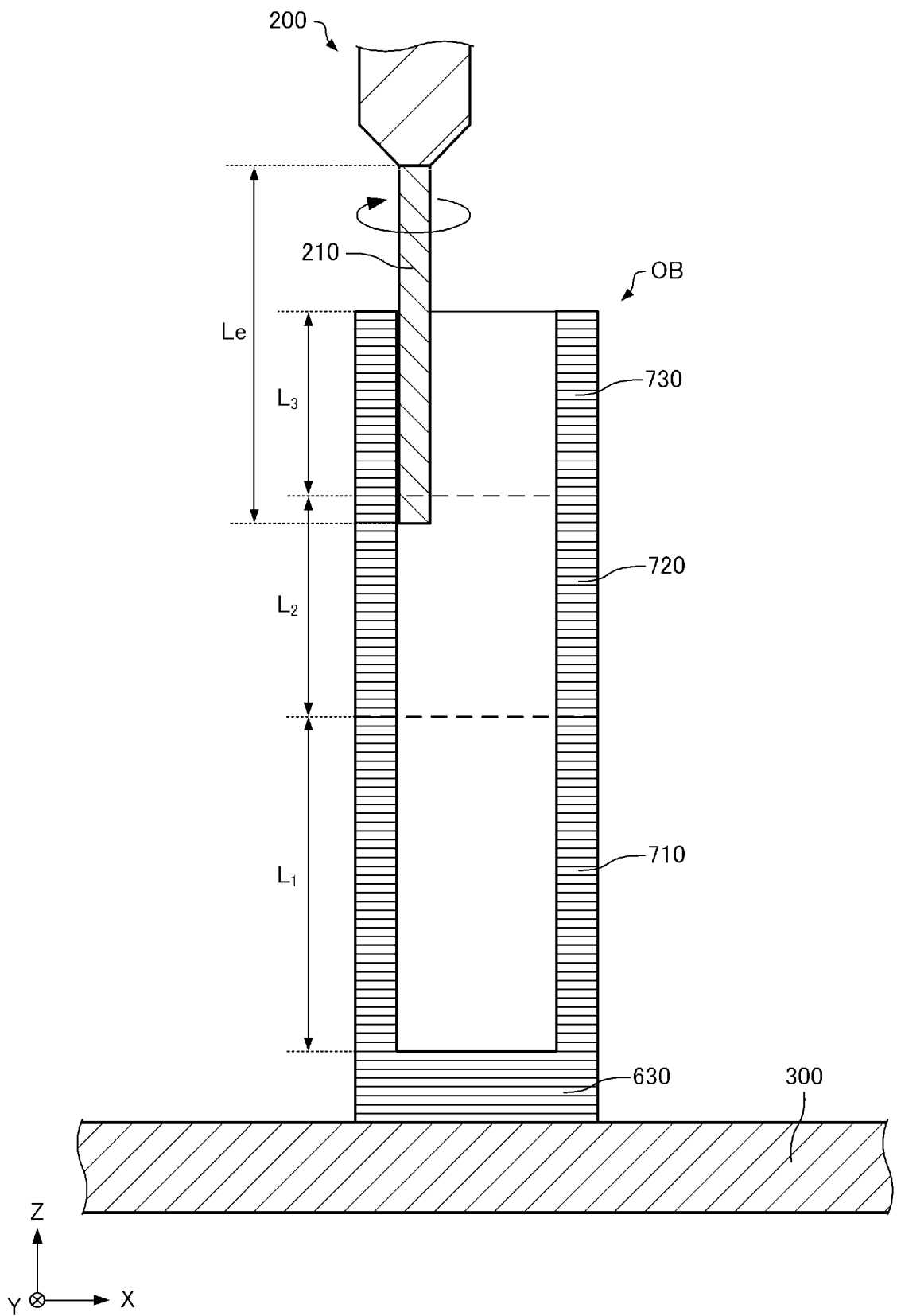
FIG. 16 is a cross-sectional view schematically showing a manufacturing step of the three-dimensional shaped object according to the present embodiment.

FIG. 16 is a cross-sectional view schematically showing a third portion cutting step. The third portion cutting step is a portion cutting step for the third time.

In the third portion cutting step, as shown in FIG. 16, the cutting tool 210 is used to cut the third portion 730 in the −Z axis direction. Specifically, in the third portion cutting step, the control unit 500 causes the cutting machine 200 to cut the cut portion 706 of the third portion 730 by executing the processing of step S25 described above according to the cutting data.

For example, after the third portion cutting step, the control unit 500 ends the shaping processing. After the shaping processing is completed, the three-dimensional shaped object OB is separated from the stage 300 by the user, the raised portion 630 is removed, or the three-dimensional shaped object OB is sintered in a furnace to manufacture the three-dimensional shaped object OB according to the design shape.

2.3. Effect

The method of manufacturing a three-dimensional shaped object OB includes: the first portion shaping step of stacking the shaping material to shape the first portion 710 having the length in the −Z axis direction shorter than the cuttable length Lc; the first portion cutting step of cutting the first portion 710 in the −Z axis direction by the cutting tool 210; and the second portion shaping step of stacking the shaping material to couple to the first end surface 712 of the first portion 710, and to shape the second portion 720 having the length in the −Z axis direction shorter than that of the first portion 710.

Therefore, in the method of manufacturing a three-dimensional shaped object OB, a shrinkage stress of the second portion 720 can be reduced as compared with a case where the length of the second portion in the −Z axis direction is equal to or larger than the length of the first portion in the −Z axis direction. Accordingly, this makes it possible to reduce the step occurred at the boundary between the first portion 710 and the second portion 720 on the surface 620 of the three-dimensional shaped object OB.

Figure 17:
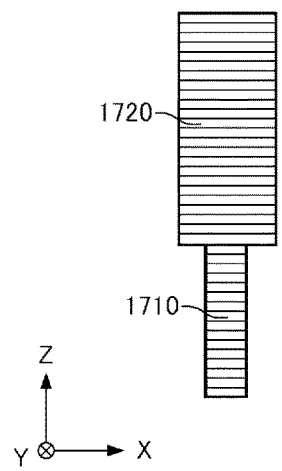
FIG. 17 is a cross-sectional view schematically showing a manufacturing step of a three-dimensional shaped object according to a reference example.
Figure 18:
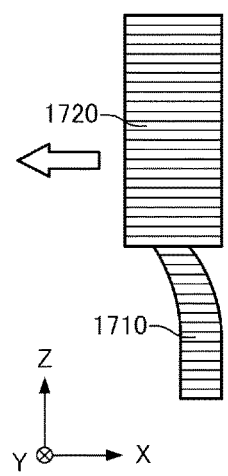
FIG. 18 is a cross-sectional view schematically showing a manufacturing step of the three-dimensional shaped object according to the reference example.
Figure 19:
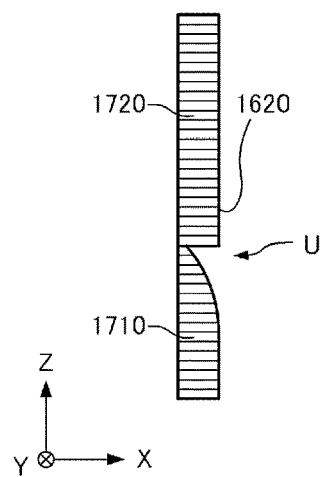
FIG. 19 is a cross-sectional view schematically showing a manufacturing step of the three-dimensional shaped object according to the reference example.

For example, as shown in FIG. 17, in the case of shaping a second portion 1720 on a first portion 1710 and having a length in the −Z axis direction equal to or larger than the first portion 1710, the second portion 1720 contracts when the second portion 1720 after shaping is naturally cooled. In this case, particularly when a shape of the first portion 1710 and the second portion 1720 is a shape surrounding a space in a plan view, the second portion 1720 tends to fall inward. When the second portion 1720 falls inward, as shown in FIG. 18, the first portion 1710 is distorted and falls inward along with the second portion 1720. When cutting is performed in this state, a step U occurs on a surface 1620 as shown in FIG. 19. FIGS. 17 to 19 are cross-sectional views schematically showing manufacturing steps of the three-dimensional shaped object according to a reference example.

As described above, in the method of manufacturing a three-dimensional shaped object OB, since the second portion 720 having the length in the −Z axis direction shorter than that of the first portion 710 is shaped, a volume of the second portion 720 can be reduced. Accordingly, the shrinkage stress occurred in the second portion 720 can be reduced, and the step occurred on the surface 620 of the three-dimensional shaped object OB can be reduced.

In the method of manufacturing a three-dimensional shaped object OB, the total length of the first portion 710 and the second portion 720 is longer than the cuttable length Le in the −Z axis direction. For example, when the first portion and the second portion are shaped by stacking the shaping material at one time, the first portion and the second portion are outside the reach of the cutting tool and the cut portion remains. However, in the method of manufacturing a three-dimensional shaped object OB, since the first portion cutting step is performed between the first portion shaping step and the second portion shaping step, even if the total length of the first portion 710 and the second portion 720 is larger than the cuttable length Le, a desired shape can be cut by the cutting tool 210 without the cut portion 706 remaining.

In the method of manufacturing a three-dimensional shaped object OB, the shape of the first portion 710 and the second portion 720 in the −Z axis direction is a shape surrounding the space K. As described above, when the first portion 710 and the second portion 720 have a shape surrounding the space K, the second portion 720 tends to fall inward. Even in such a case, in the method of manufacturing a three-dimensional shaped object OB, since the length $L_2$ of the second portion 720 in the −Z axis direction is shorter than the length $L_1$ of the first portion 710 in the −Z axis direction, the step occurred on the surface 620 can be reduced.

In the method of manufacturing a three-dimensional shaped object OB, the contraction force w of the second portion 720 satisfies $w \leq 0.009 \, EI/L_1^3$ where the length of the first portion 710 in the −Z axis direction is $L_1$, the Young's modulus of the first portion 710 is E, and the moment of inertia of area of the first portion 710 is I. Therefore, even if a step occurs at the boundary between the first portion 710 and the second portion 720 on the surface 620, the height of the step can be reduced to be 0.003 mm or less, and it is possible to make the step less visible.

In the method of manufacturing a three-dimensional shaped object OB, the second portion shaping step includes the heating step of heating the first end surface 712 of the first portion 710. Therefore, in the method of manufacturing a three-dimensional shaped object OB, adhesion between the first portion 710 and the second portion 720 can be improved. Accordingly, mechanical strength of the three-dimensional shaped object OB can be improved.

The method of manufacturing a three-dimensional shaped object OB includes, before the first portion cutting step, the raised portion shaping step of stacking the shaping material on the stage 300 to shape the raised portion 630 that secures the distance between the first portion 710 and the stage 300. Therefore, in the method of manufacturing a three-dimensional shaped object OB, interference between the cutting machine 200 and the stage 300 can be prevented in the first portion cutting step.

The method of manufacturing a three-dimensional shaped object OB includes: the second portion cutting step of cutting the second portion 720 in the −Z axis direction by the cutting tool 210; and the third portion shaping step of stacking the shaping material to couple to the second end surface 722 of the second portion 720, and to shape the third portion 730 having the length in the −Z axis direction shorter than that of the second portion 720. Therefore, in the method of manufacturing a three-dimensional shaped object OB, a shrinkage stress of the third portion 730 can be reduced as compared with a case where the length of the third portion in the −Z axis direction is equal to or larger than the length of the second portion in the −Z axis direction. Accordingly, this makes it possible to reduce the step occurred at the boundary between the second portion 720 and the third portion 730 on the surface 620 of the three-dimensional shaped object OB.

3. Modification

In the example described above, the ABS in the form of pellets is used as the shaping material for shaping the three-dimensional shaped object, but examples of the material used in the shaping machine 100 may include a material having various materials such as a material having thermoplasticity other than ABS, a metal material, and a ceramic material as a main material. Here, the term "main material" means a central material for forming a shape of the three-dimensional shaped object, and a material occupying a content of 50% by weight or more in the three-dimensional shaped object. The above shaping material includes those in which main materials are melted alone, and those in which some of the contained components are melted together with the main materials to form a paste.

When the material having thermoplasticity is used as the main material, the shaping material is generated by plasticizing the material in the melting unit 30. The term "plasticize" means that the material having thermoplasticity is softened by being heated to a temperature equal to or higher than a glass transition point, and exhibits fluidity.

For example, the thermoplastic resin can be used as the material having thermoplasticity. Examples of the thermoplastic resin include general-purpose engineering plastics such as a polypropylene (PP), a polyethylene (PE), a polyacetal (POM), a polyvinyl chloride (PVC), a polyamide (PA), an acrylonitrile-butadiene-styrene (ABS), a polylactic acid (PLA), a polyphenylene sulfide (PPS), polycarbonate (PC), modified polyphenylene ether, polybutylene terephthalate, and polyethylene terephthalate, and engineering plastics such as polysulfone, polyether sulfone, polyphenylene sulfide, polyarylate, polyimide, polyamideimide, polyetherimide, and polyetheretherketone (PEEK).

Additives such as a wax, a flame retardant, an antioxidant, or a heat stabilizer may be mixed into the material having thermoplasticity, in addition to a pigment, a metal and a ceramic. The material having thermoplasticity is plasticized by the rotation of the flat screw 40 and the heating of the heater 58 and is then converted into a melted state in the melting unit 30. After the shaping material thus generated is discharged from the nozzle hole 66, the shaping material is cured due to a reduction in temperature.

It is desirable that the material having thermoplasticity is injected from the nozzle hole 66 in a state where the material is heated to the temperature equal to or higher than the glass transition point and is completely melted. For example, a glass transition point of the ABS is about 120° C., and it is desirable that the ABS is injected from the nozzle hole 66 at about 200° C. In order to inject the shaping material in such a high temperature state, a heater may be provided around the nozzle hole 66. The term "melt" means not only that the material having thermoplasticity is heated to a temperature equal to or higher than a melting point to become a liquid, but also the material having thermoplasticity is plasticized.

In the shaping machine 100, for example, a metal material may be used as the main material instead of the above material having thermoplasticity. In this case, it is desirable that a component to be melted at the time of forming the shaping material is mixed with a powder material obtained by converting the metal material into powder, and then the mixture is charged into the melting unit 30.

Examples of the metal material include a single metal of magnesium (Mg), iron (Fe), cobalt (Co) or chromium (Cr), aluminum (Al), titanium (Ti), copper (Cu), nickel (Ni), or an alloy containing one or more these metals, or maraging steel, stainless steel, cobalt chrome molybdenum, titanium alloy, nickel alloy, aluminum alloy, cobalt alloy, and cobalt chromium alloy.

In the shaping machine 100, a ceramic material may be used as the main material instead of the above metal material. Examples of the ceramic material include oxide ceramics such as silicon dioxide, titanium dioxide, aluminum oxide, and zirconium oxide, and non-oxide ceramics such as aluminum nitride. When the above metal material or ceramic material is used as the main material, the shaping material disposed on the stage 300 may be cured by, for example, sintering with laser irradiation or warm air.

The powder material of the metal material or the ceramic material charged into the material supply unit 20 may be a mixed material obtained by mixing a plurality of types of powder of single metal powder, alloy powder, and ceramic material powder. The powder material of the metal material or the ceramic material may be coated with, for example, the above thermoplastic resin or a thermoplastic resin other than the above thermoplastic resin. In this case, the thermoplastic resin may be melted in the melting unit 30 to exhibit fluidity.

For example, solvents can be added to the powder material of the metal material or the ceramic material charged into the material supply unit 20. Examples of the solvent include water, (poly)alkylene glycol monoalkyl ethers such as ethylene glycol monomethyl ether, ethylene glycol monoethyl ether, propylene glycol monomethyl ether, and propylene glycol monoethyl ether, acetate esters such as ethyl acetate, n-propyl acetate, iso-propyl acetate, n-butyl acetate, and iso-butyl acetate, aromatic hydrocarbons such as benzene, toluene, and xylene, ketones such as methyl ethyl ketone, acetone, methyl isobutyl ketone, ethyl-n-butyl ketone, diisopropyl ketone, and acetylacetone, alcohols such as ethanol, propanol, and butanol, tetraalkylammonium acetates, sulfoxide-based solvents such as dimethyl sulfoxide and diethyl sulfoxide, pyridine-based solvents such as pyridine, γ-picoline, and 2,6-lutidine, tetraalkylammonium acetates (such as tetrabutylammonium acetate), and ionic liquids such as butyl carbitol acetate.

In addition, for example, a binder may be added to the powder material of the metal material or the ceramic material charged into the material supply unit 20. Examples of the binder include acrylic resin, epoxy resin, silicone resin, cellulose-based resin or other synthetic resins or polylactic acid (PLA), polyamide (PA), polyphenylene sulfide (PPS), polyetheretherketone (PEEK) or other thermoplastic resins.

The present disclosure includes a configuration substantially the same as the configuration described in the embodiments, for example, a configuration having the same function, method and result, or a configuration having the same purpose and effect. The present disclosure includes a configuration in which a non-essential portion of the configuration described in the embodiment is replaced. In addition, the present disclosure includes a configuration having the same action and effect as the configuration described in the embodiment, or a configuration capable of achieving the same object. The present disclosure includes a configuration in which a known technique is added to the configuration described in the embodiment.

The following contents are derived from the above embodiment.

One aspect of a method of manufacturing a three-dimensional shaped object, which is a method of shaping a three-dimensional shaped object using a cutting tool configured to cut a first length in a cutting direction, includes: a first portion shaping step of stacking a shaping material to shape a first portion having a length in the cutting direction shorter than the first length; a first portion cutting step of cutting the first portion in the cutting direction by the cutting tool; and a second portion shaping step of stacking the shaping material to couple to a first end surface of the first portion in a direction opposite to the cutting direction, and to shape a second portion having a length in the cutting direction shorter than that of the first portion.

According to the method of manufacturing a three-dimensional shaped object, a shrinkage stress of the second portion can be reduced as compared with a case where the length of the second portion in cutting direction is equal to or larger than the length of the first portion in the cutting direction. Accordingly, this makes it possible to reduce a step occurred at a boundary between the first portion and the second portion on a surface of the three-dimensional shaped object.

In one aspect of the method of manufacturing a three-dimensional shaped object, the cutting direction may be a direction opposite to a stacking direction of the shaping material.

In one aspect of the method of manufacturing a three-dimensional shaped object, a total length of the first portion and the second portion may be longer than the first length in the cutting direction.

According to the method of manufacturing a three-dimensional shaped object, since the first portion cutting step is performed between the first portion shaping step and the second portion shaping step, even if the total length of the first portion and the second portion is larger than the cuttable length, a desired shape can be cut by the cutting tool without the cut portion remaining.

In one aspect of the method of manufacturing a three-dimensional shaped object, a shape of the first portion and the second portion in the cutting direction may be a shape surrounding a space.

According to the method of manufacturing a three-dimensional shaped object, since the length of the second portion in the cutting direction is shorter than the length of the first portion in the cutting direction, even if the second portion tends to fall inward, the step occurred on the surface of the three-dimensional shaped object can be reduced.

In one aspect of the method of manufacturing a three-dimensional shaped object, a contraction force w of the second portion may satisfy $w \leq 0.009 \, EI/L_1^3$ where a length of the first portion in the cutting direction is $L_1$, a Young's modulus of the first portion is E, and a moment of inertia of area of the first portion is I.

According to the method of manufacturing a three-dimensional shaped object, even if a step occurs at the boundary between the first portion and the second portion on the surface of the three-dimensional shaped object, it is possible to make the step less visible.

In one aspect of the method of manufacturing a three-dimensional shaped object, the second portion shaping step may include a heating step of heating the first end surface.

According to the method of manufacturing a three-dimensional shaped object, adhesion between the first portion and the second portion can be improved.

One aspect of the method of manufacturing a three-dimensional shaped object may further include: before the first portion shaping step, a raised portion shaping step of stacking the shaping material on a stage to shape a raised portion that secures a distance between the first portion and the stage.

According to the method of manufacturing a three-dimensional shaped object, interference between the cutting machine and the stage can be prevented in the first portion cutting step.

One aspect of the method of manufacturing a three-dimensional shaped object may further include: a second portion cutting step of cutting the second portion in the cutting direction by the cutting tool; and a third portion shaping step of stacking the shaping material to couple to a second end surface of the second portion in a direction opposite to the cutting direction, and to shape a third portion having a length in the cutting direction shorter than that of the second portion.

According to the method of manufacturing a three-dimensional shaped object, it is possible to reduce the step occurred at a boundary between the second portion and the third portion on the surface of the three-dimensional shaped object.

One aspect of a three-dimensional shaping device includes: a shaping machine configured to stack a shaping material; a cutting machine having a cutting tool configured to cut a first length in a cutting direction; and a control unit configured to control the shaping machine and the cutting machine, in which the control unit causes the shaping machine to stack the shaping material to shape a first portion having a length in the cutting direction shorter than the first length; causes the cutting machine to cut the first portion in the cutting direction using the cutting tool; and causes the shaping machine to stack the shaping material to couple to a first end surface of the first portion in a direction opposite to the cutting direction, and to shape a second portion having a length in the cutting direction shorter than that of the first portion.

According to the three-dimensional shaping device, it is possible to reduce a step occurred at a boundary between the first portion and the second portion on a surface of a three-dimensional shaped object.

What is claimed is:

1. A method of manufacturing a three-dimensional shaped object, which is a method of shaping a three-dimensional shaped object using a cutting tool configured to cut in a cutting direction, the method of manufacturing a three-dimensional shaped object comprising:
    a first portion stacking step of stacking a shaping material to shape a first portion having a length in the cutting direction shorter than a first length;
    a first portion cutting step of cutting the first portion in the cutting direction by the cutting tool; and
    a second portion stacking step of stacking the shaping material to couple to a first end surface of the first portion in a direction opposite to the cutting direction, and to shape a second portion having a length in the cutting direction shorter than that of the first portion,
    wherein,
    the first length is a maximum length that is cuttable in the cutting direction by the cutting tool,
    a contraction force w of the second portion satisfies $w \leq 0.009 \, EI/L_1^3$,
    where a length of the first portion in the cutting direction is $L_1$, a Young's modulus of the first portion is $E$, and a moment of inertia of area of the first portion is $I$.

2. The method of manufacturing a three-dimensional shaped object according to claim 1, wherein
    the cutting direction is a direction opposite to a stacking direction of the shaping material.

3. The method of manufacturing a three-dimensional shaped object according to claim 1, wherein
    a total length of the first portion and the second portion is longer than the first length in the cutting direction.

4. The method of manufacturing a three-dimensional shaped object according to claim 1, wherein
    a shape of the first portion and the second portion in the cutting direction is a shape surrounding a space.

5. The method of manufacturing a three-dimensional shaped object according to claim 1, wherein
    the second portion stacking step further includes a heating step of heating the first end surface.

6. The method of manufacturing a three-dimensional shaped object according to claim 1, further comprising:
    before the first portion stacking step, a raised portion stacking step of stacking the shaping material on a stage to shape a raised portion that secures a distance between the first portion and the stage.

7. The method of manufacturing a three-dimensional shaped object according to claim 1, further comprising:
    a second portion cutting step of cutting the second portion in the cutting direction by the cutting tool; and
    a third portion stacking step of stacking the shaping material to couple to a second end surface of the second portion in the direction opposite to the cutting direction, and to shape a third portion having a length in the cutting direction shorter than that of the second portion.

8. A three-dimensional shaping device comprising:
    a stacking machine configured to stack a shaping material;
    a cutting machine having a cutting tool configured to cut in a cutting direction; and
    a control unit configured to control the shaping machine and the cutting machine,
    wherein
    the control unit
        causes the shaping machine to stack the shaping material to shape a first portion having a length in the cutting direction shorter than a first length;
        causes the cutting machine to cut the first portion in the cutting direction using the cutting tool; and
        causes the shaping machine to discharge the shaping material to couple to a first end surface of the first portion in a direction opposite to the cutting direction, and to shape a second portion having a length in the cutting direction shorter than that of the first portions,
    wherein,
    the first length is a maximum length that is cuttable in the cutting direction by the cutting tool,
    a contraction force w of the second portion satisfies $w \leq 0.009 \, EI/L_1^3$, where a length of the first portion in the cutting direction is $L_1$, a Young's modulus of the first portion is E, and a moment of inertia of area of the first portion is I.

\* \* \* \* \*